United States Patent [19]

Kellner et al.

[11] 3,851,384
[45] Dec. 3, 1974

[54] PROCESS FOR FABRICATING WALLS

[76] Inventors: Raymond M. Kellner, 4505 N. Brawley, Fresno, Calif. 93705; Minor E. Gee, 1231 Hawley, Sanger, Calif. 93657

[22] Filed: Mar. 1, 1972

[21] Appl. No.: 231,055

Related U.S. Application Data

[62] Division of Ser. No. 865,742, Oct. 13, 1969, Pat. No. 3,688,965.

[52] U.S. Cl. .............................. 29/430, 29/200 A
[51] Int. Cl. ....................... E04b 2/70, B23p 21/00
[58] Field of Search ............... 29/430, 429, 200 A; 144/318, 319, 316; 227/21, 45

[56] References Cited
UNITED STATES PATENTS

| | | | |
|---|---|---|---|
| 2,574,163 | 11/1951 | Bamford | 29/430 |
| 3,277,939 | 10/1966 | Scott | 144/316 |
| 3,399,445 | 9/1968 | Carroll | 29/430 |
| 3,443,303 | 5/1969 | Groat | 29/430 |
| 3,564,702 | 2/1971 | Hurn et al. | 29/298 C |

Primary Examiner—C. W. Lanham
Assistant Examiner—Dan C. Crane
Attorney, Agent, or Firm—Huebner & Worrel

[57] ABSTRACT

A process for fabricating walls from wood framing materials, particularly suited for use in fabricating walls of a type normally employed in constructing frame structures and the like, characterized by an employment of a series of sequentially actuated machine systems electrically interconnected for selecting and feeding components and for selectively assembling the components into walls having adjustably regulated dimensions and selectively controlled spaced and dimensioned openings defining doors, windows and the like, a particular feature of the invention being a combination of an electrical control system interconnected with a series of operative systems for driving the machine through a predetermined sequence of machine events, in redundant or non-redundant modes, for fabricating a series of walls to be erected into frame structures.

10 Claims, 30 Drawing Figures

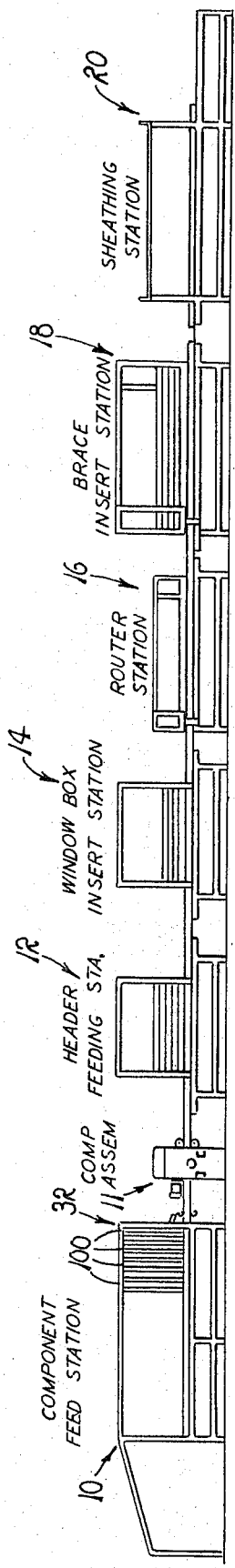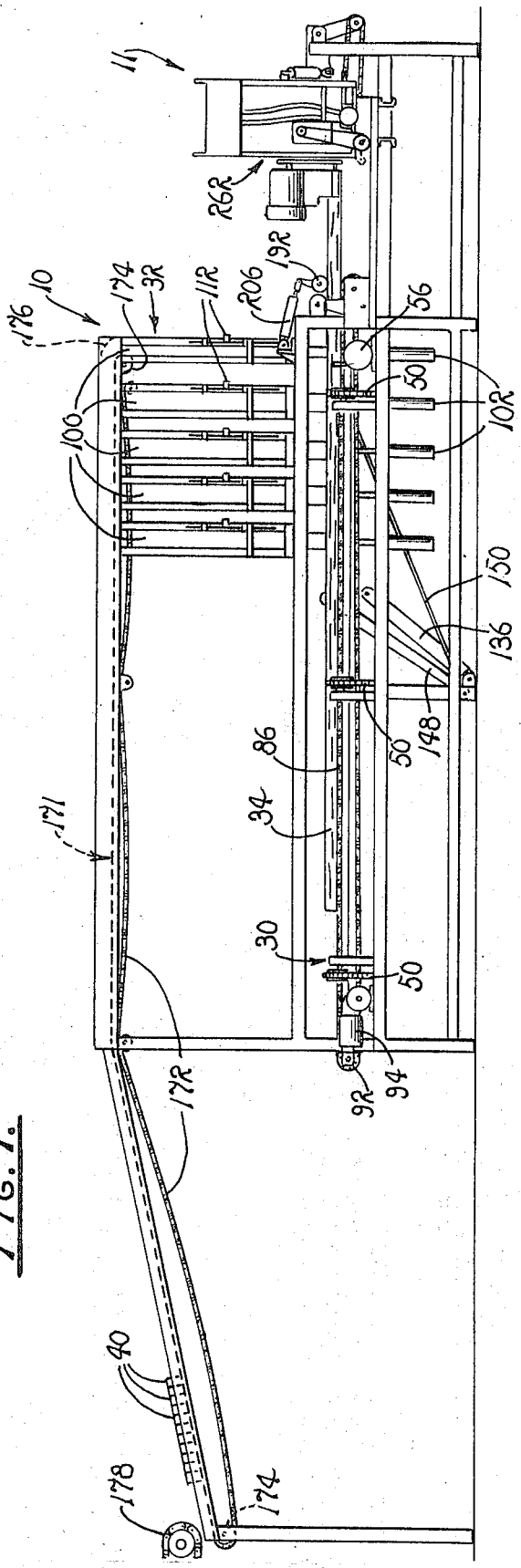

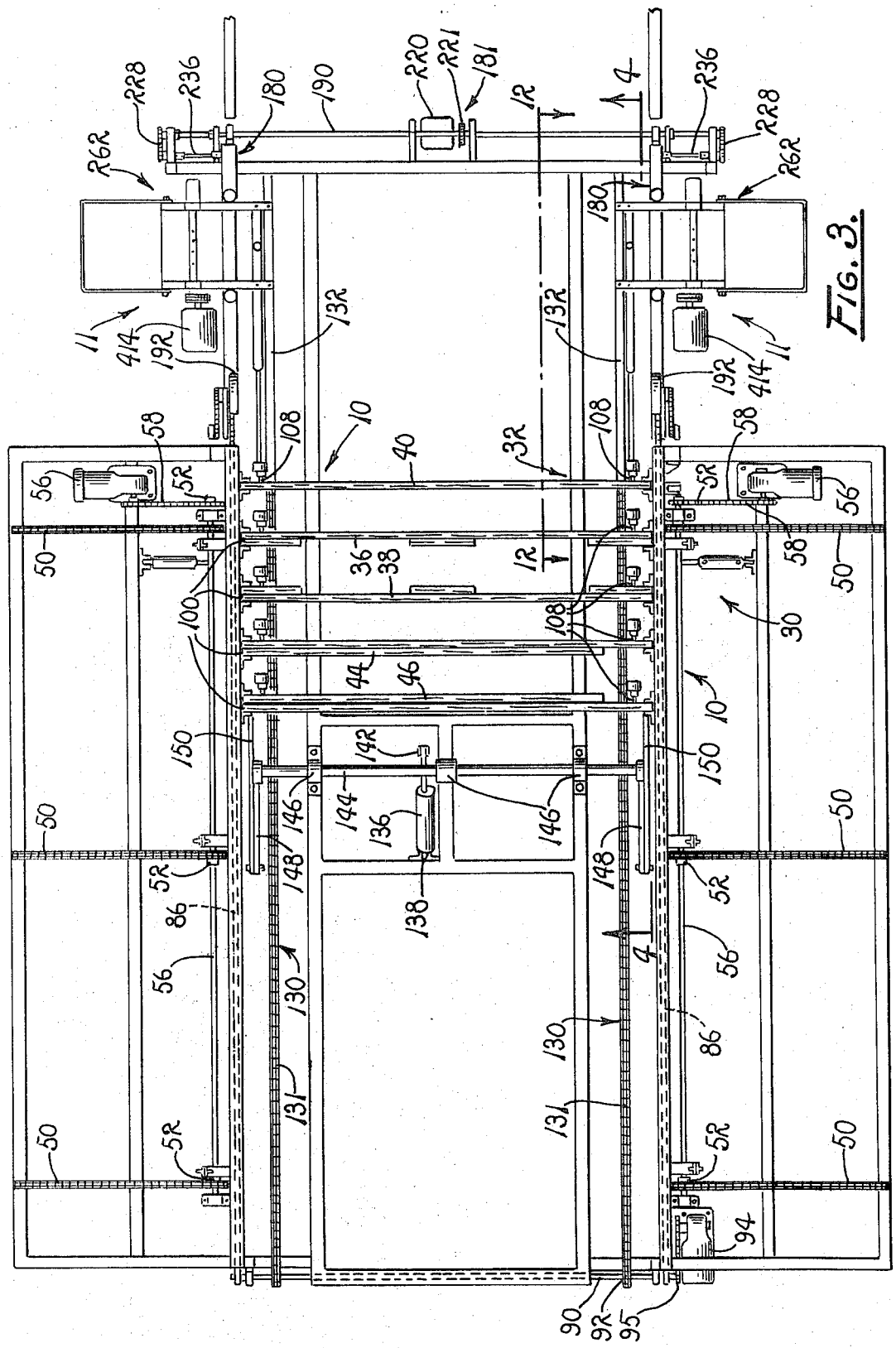

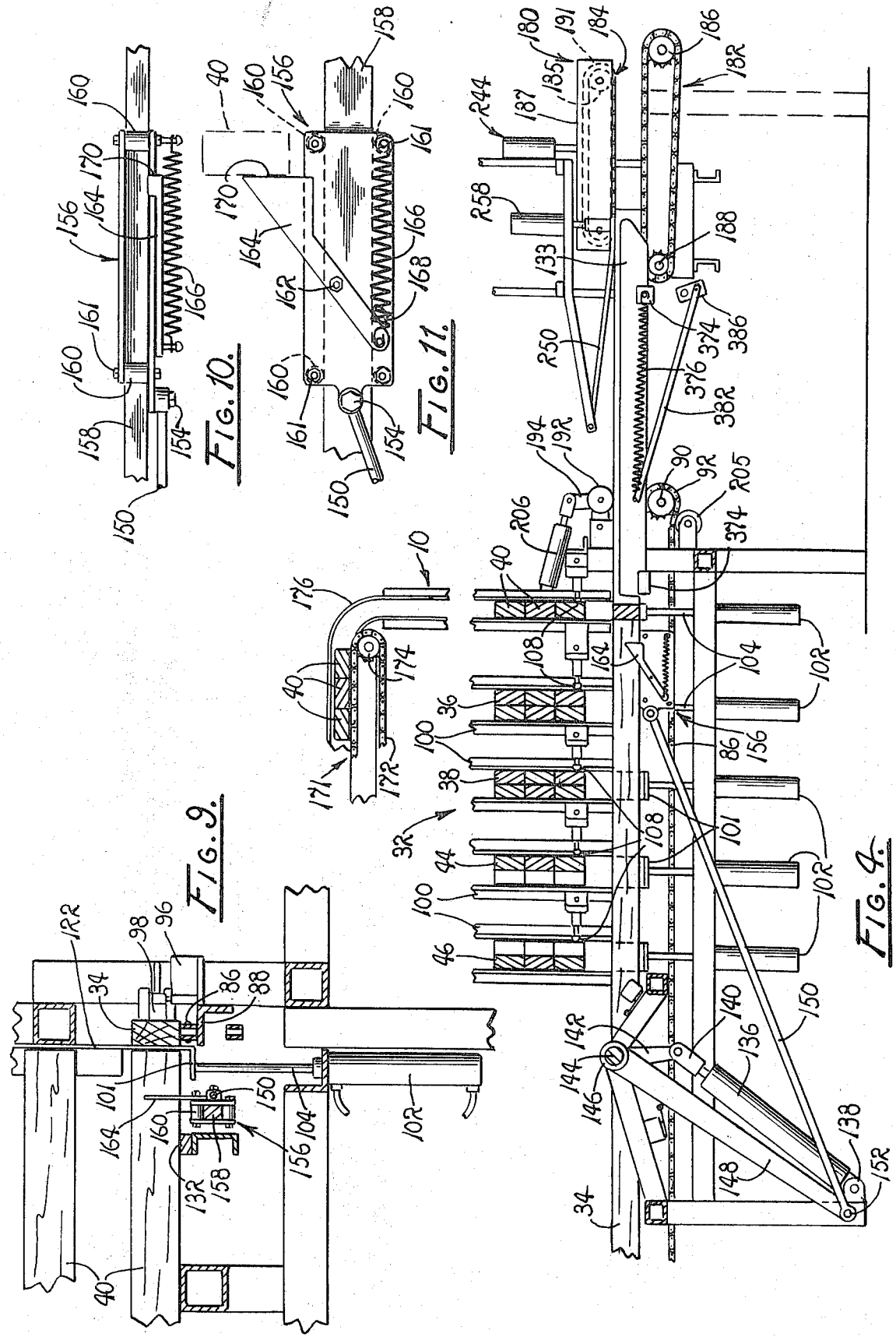

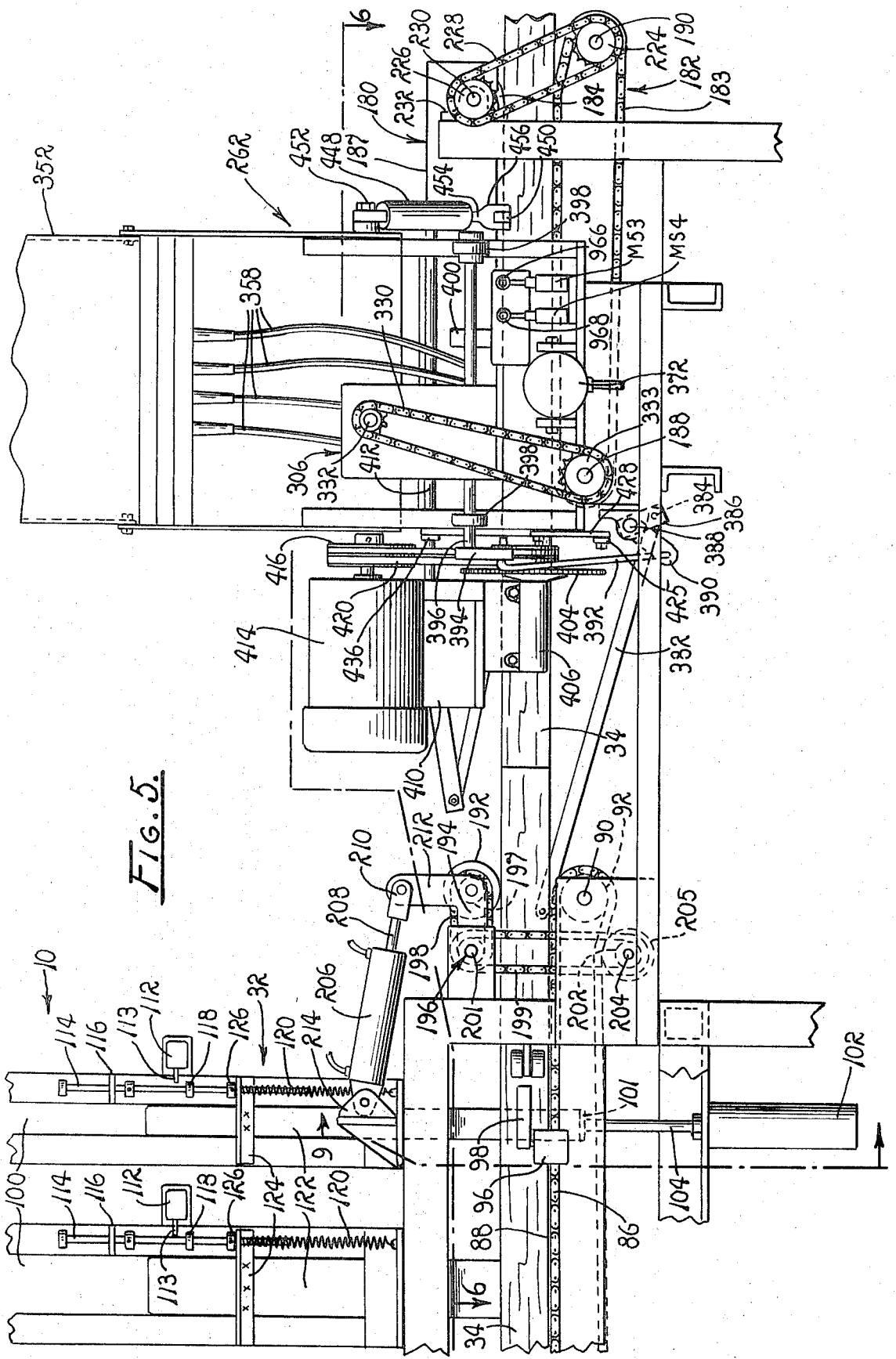

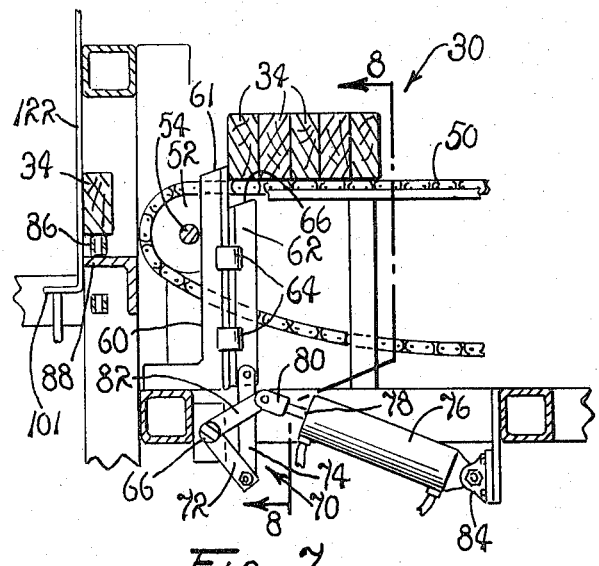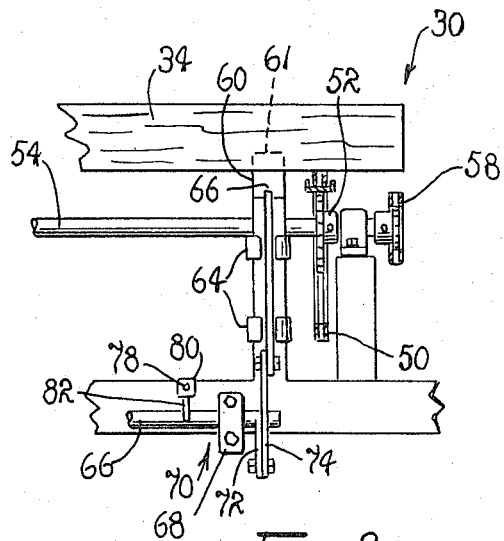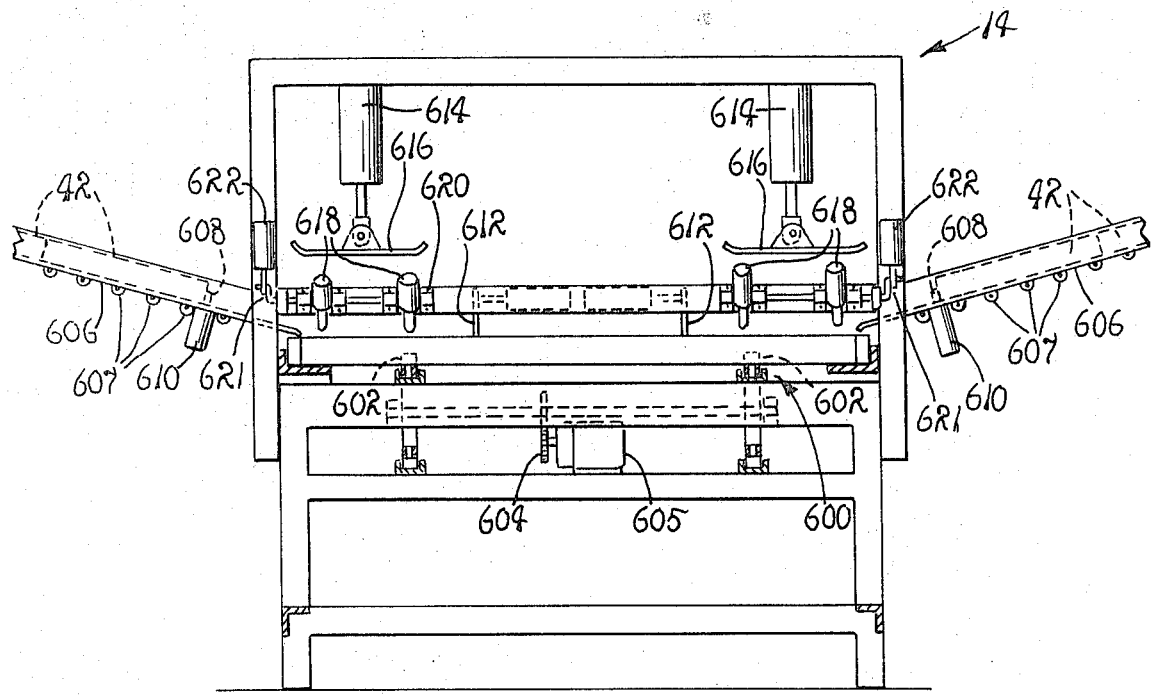

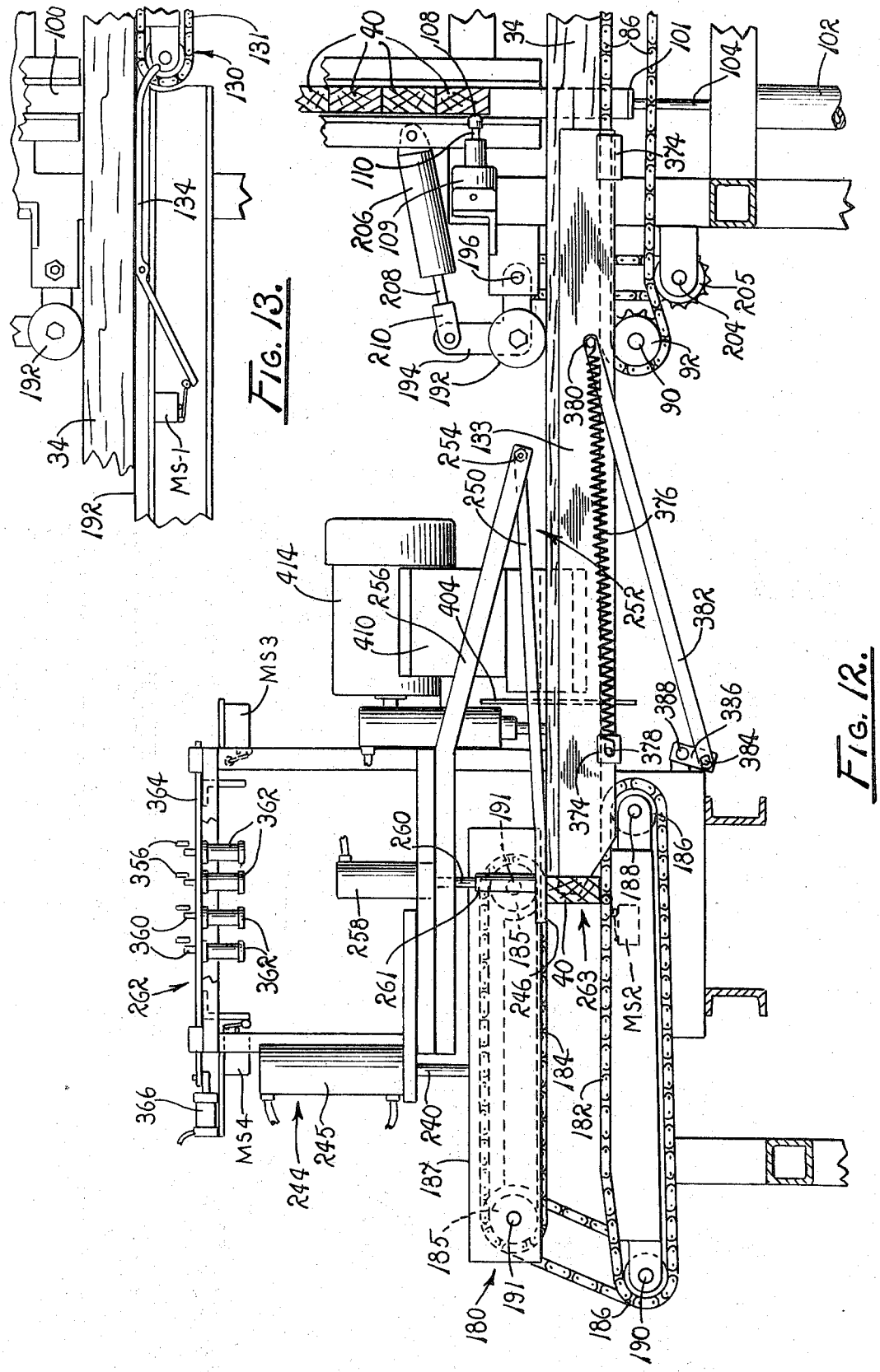

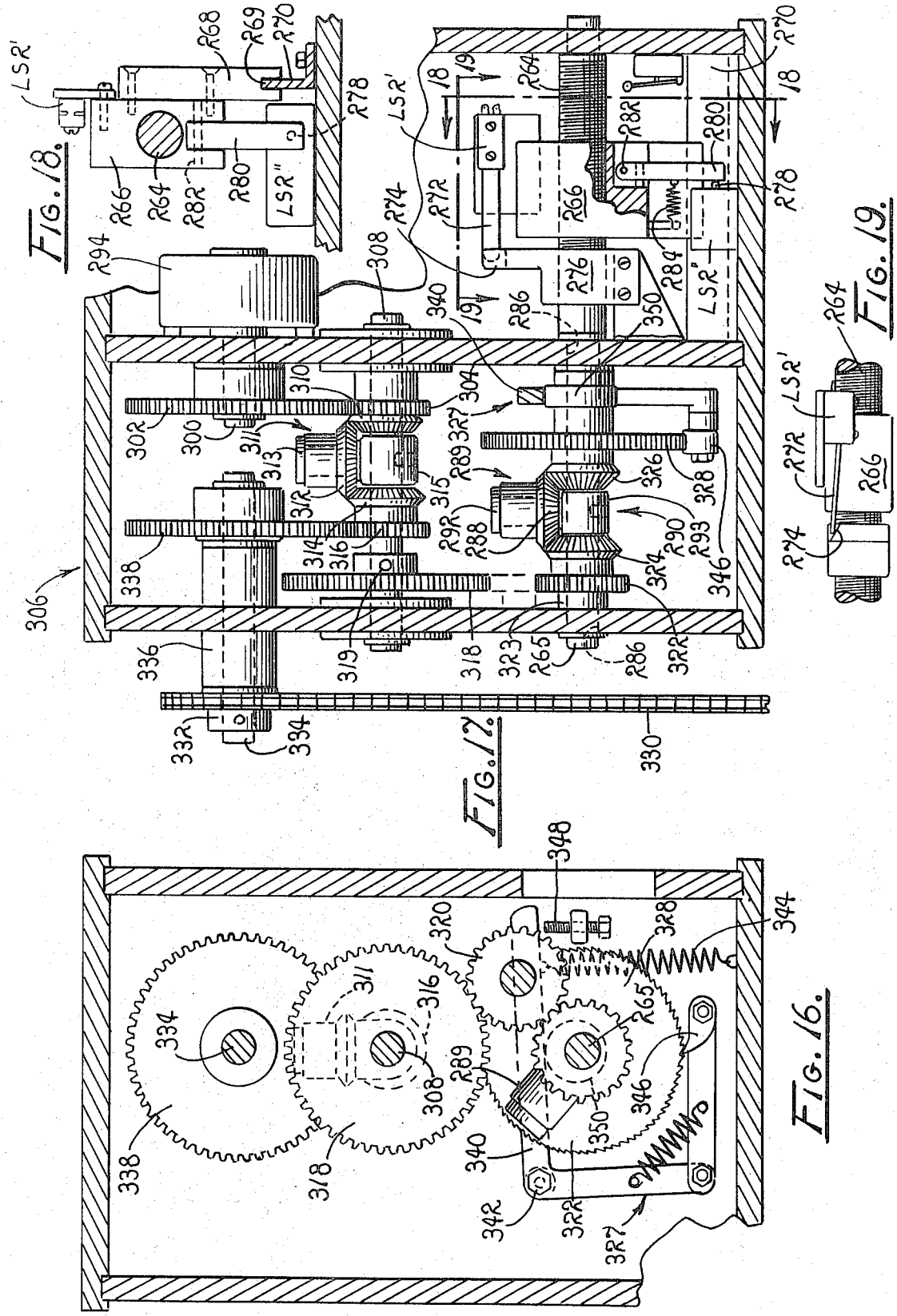

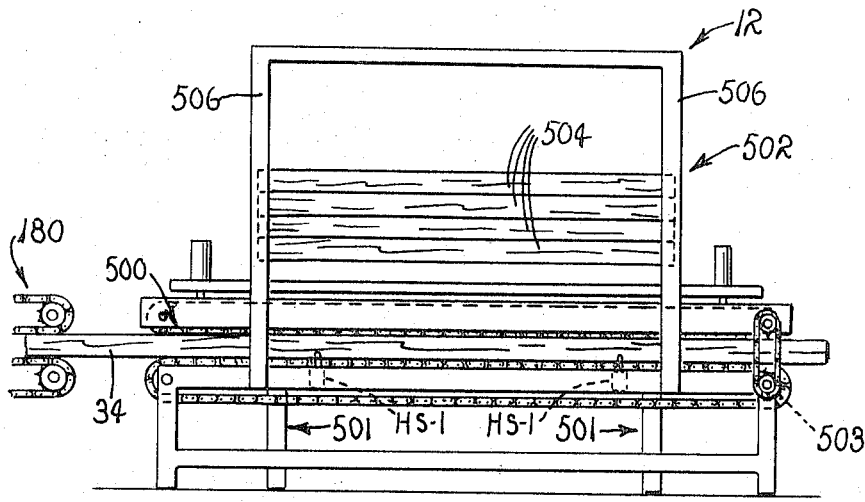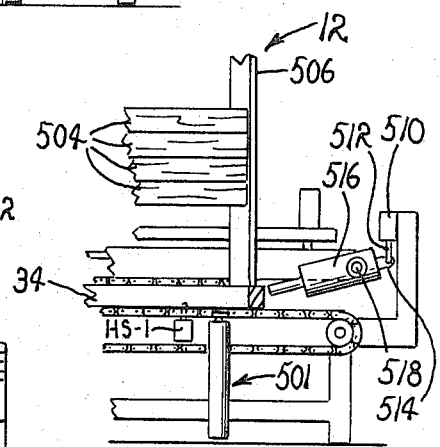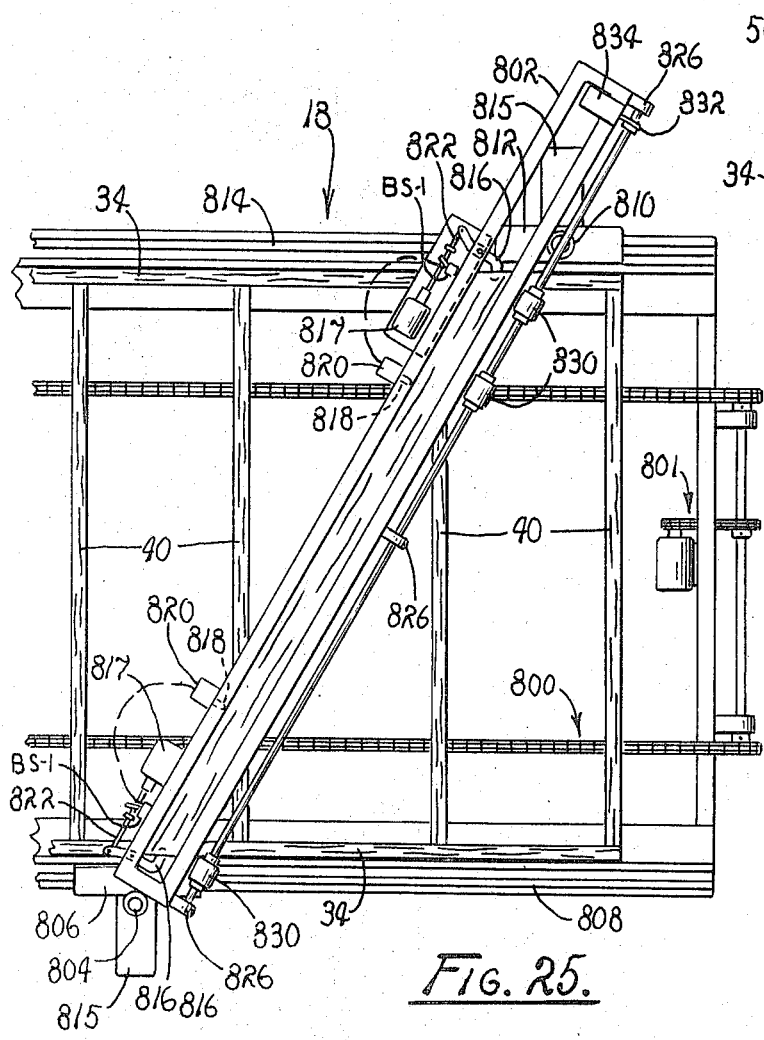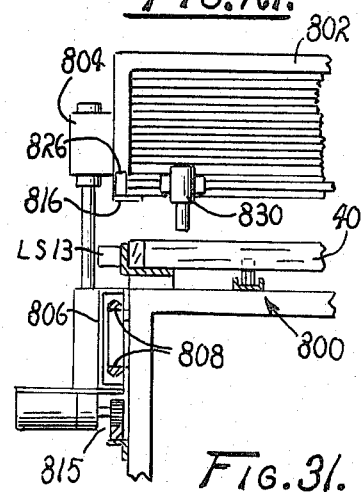

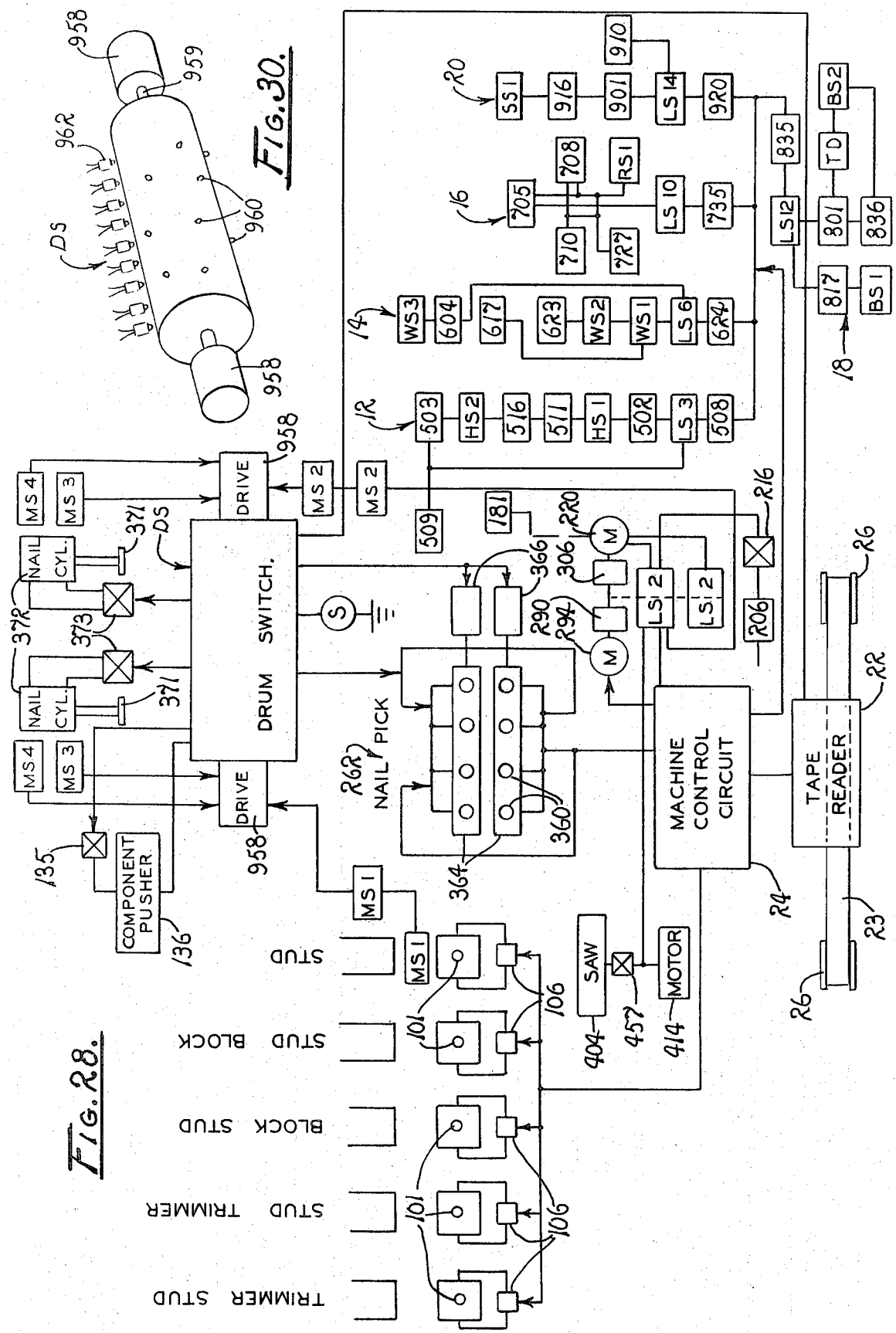

| STEP NO. | CONTROL SWITCH FUNCTION | COMP PUSHER ADV. | COMP PUSHER RET. | NAILER PICK BAR ADV. | DRIVE NAILS | NAIL DRIVE RETURN | READ TAPE | CANCEL NAIL PATTERN | FEED WALL | SET NAIL PATTERN | Description |
|---|---|---|---|---|---|---|---|---|---|---|---|
| 1 | MS1 & MS1-1 | X | | | | | | | | | ADVANCE COMPONENT |
| 2 | AUTO. STEP | | | | | | | | | X | SET NAIL PATTERN |
| 3 | AUTO. STEP | | X | | | | | | | | ADVANCE PICK BAR |
| 4 | MS2, LS2, MS2 | | | X | | | | | | | COMPONENT IN NAIL POSITION |
| 5 | AUTO. STEP | | | | X | | | | | | NAIL & CANCEL PATTERN |
| 6 | AUTO. STEP | | | | | X | | | | | READ TAPE FOR NEW CYCLE |
| 7 | MS3 & MS3 | | | | | | X | | | | NAIL DRIVE AT END OF NAILING STROKE |
| 8 | AUTO. STEP | | | | | | | X | | | NAILING STROKE RETURN COMPLETE |
| 9 | MS4 & MS4 | | | | | | | | X | | ADVANCE WALL |
| 10 | AUTO. STEP | | | | | | | | | | |
| 11 | AUTO. STEP | | | | | | | | | | |
| 12 | AUTO. STEP | | | | | | | | | | |

PROCESS FOR FABRICATING WALLS

This is a divisional application of application Ser. No. 865,742, filed Oct. 13, 1969, now U.S. Pat. No. 3,688,965.

BACKGROUND OF THE INVENTION

The invention relates to the fabrication of frame structures and more particularly to machine fabrication of walls of predetermined and adjustably regulated size and configuration to be employed in erecting buildings of frame construction.

Frame structures normally are erected by age-old custom framing techniques which necessitate an on-site cutting of selected timbers to required dimensions and then joining the selected members according to given building plans. Techniques presently employed in framing buildings, including dwellings, inherently involve numerous redundant efforts. However, due to the individuality of each wall incorporated within frame buildings, a large force of skilled workmen is normally required at on-site building locations. The result necessarily flowing from this combination of conditions is that skilled workmen expend large quantities of time performing time-consuming redundant functions. Furthermore, since conventional framing techniques usually require operations performed on-site, efficiency is severely inhibited due to an existing lack of convenient equipment suitable for automating construction and assembly of wall structures. This is particularly true where the buildings being erected are widely variable in their wall requirements. Consequently, a waste in building materials, as well as a loss of time inherently attends the use of the techniques presently employed in framing buildings. This inadequacy becomes particularly acute where given buildings must be constructed with a minimum supply of skilled labor supported by a minimum budget.

The prior art is replete with prefabrication techniques for fabricating selected subassemblies ultimately to be utilized as a building is erected. These techniques employ numerous jigs and various types of control systems for positioning and rigidly supporting manually selected structural members in a given orientation while a joining of the members is effected through processes including nailing, bolting, clamping and the like. Normally, the structural members, once properly oriented, are nailed in place through nailing operations, frequently employing hand operated hammers, nailing guns, and the like. Unfortunately, only certain simple building structures of repetitive structural form are subject to being efficiently fabricated utilizing known techniques, due to the fact that, in fabricating complex structures, each subassembly normally requires a separate and a unique jig of a fixed dimension. Consequently, it has been found economically prohibitive to provide the required number of jigs and combinations of jigs for supplying subassemblies for most practical construction purposes. This is particularly true where the selected configuration for the subassembly must be custom-built for providing a unique complex building subassembly.

SUMMARY OF THE INVENTION

This invention overcomes many of the aforementioned difficulties through a novel process for fabricating redundant or non-redundant walls employing a multiplicity of interrelated slaved systems located at a series of stations through which various framing components, and related materials, selectively are indexed in response to a series of machine control signals derived from a convenient source of intelligence, such as a coded tape, and supplied to a machine control circuit which operatively dictates control of the slaved systems in accordance with the coded intelligence.

Accordingly, an object of the instant invention is to provide a process for serially fabricating walls having individually controlled dimensions and configurations for use in framing buildings and the like.

Another object is to provide a process for completing the fabrication of a wall from a plurality of building components for reducing on-site time requirements, and overall construction costs.

Another object is to provide an improved process wherein studs, plates, headers, trimmers and the like are selected, assembled and nailed into a series of walls of individually controlled dimensions and configurations for delivery as construction subassemblies and erected on-site with minimal labor requirements.

Another object is to provide an improved process for fabricating a series of walls to be transported and subsequently employed in framing buildings while employing a minimum of on-site fabrication operations.

These together with other objects and advantages which will subsequently become apparent are directed to the broad purposes of substantially reducing the costs of building construction, improving its quality, and speeding up its production time.

BRIEF DESCRIPTION OF THE DRAWINGS

FIG. 1 is a schematic diagram of the machine embodying the principles of the present invention.

FIG. 2 is an elevation of the component feed station mechanism employed in delivering certain wall components including vertical support members, wall plates and the like.

FIG. 3 is a plan view, on somewhat an enlarged scale, of the component feed station mechanism illustrated in FIG. 2.

FIG. 4 is a sectional view taken on line 4—4 of FIG. 3.

FIG. 5 is a partial side elevation, on an enlarged scale, of the component feed station and the component assembly station illustrated in FIG. 4.

FIG. 7 is a fragmentary elevation of the plate delivery conveyor, taken generally along line 7—7 of FIG. 6.

FIG. 8 is a fragmentary elevation taken generally along line 8—8 of FIG. 7.

FIG. 9 is a sectional elevation taken generally along line 9—9 of FIG. 5.

FIG. 10 is a detailed plan view, on an enlarged scale, of the component pusher head employed in advancing various wall components.

FIG. 11 is a detailed side view of the pusher head illustrated in FIG. 10.

FIG. 12 is a side elevation, on somewhat of an enlarged scale, taken along line 12—12 of FIG. 3.

FIG. 13 is an enlarged detail view of a microswtich actuating mechanism employed in initiating a component advance operation for the machine embodying the principles of the instant invention.

FIG. 16 is an end view of a timing mechanism employed by the machine.

FIG. 17 is a plan view of the timing mechanism illustrated in FIG. 16.

FIG. 18 is a sectioned, fragmentary end view taken along line 18—18 of FIG. 17.

FIG. 19 is a fragmentary sectional view taken on line 19—19 of FIG. 18.

FIG. 20 is a side elevation of the header feeder shown in FIG. 1.

FIG. 21 is an enlarged fragmentary view of a portion of the header feeder shown in FIG. 20.

FIG. 22 is an end elevation illustrating the mechanism employed in feeding window boxes.

FIG. 25 is a top plan view of the brace feeder at the brace assembly station.

FIG. 28 is a block diagram of the control circuit for the machine embodying the principles of the instant invention, illustrating the circuits employed at the various stations depicted in FIG. 1 and through which each wall ultimately is conveyed.

FIG. 29 is a timing chart illustrating the sequential operation of the machine.

FIG. 30 is a perspective view of a drum-switch which may be employed for achieving a sequential operation of the machine.

FIG. 31 is a fragmentary side view taken at one end of the brace assembly station, as shown in FIG. 25.

DESCRIPTION OF THE PREFERRED EMBODIMENT

General Description

Figure 6:
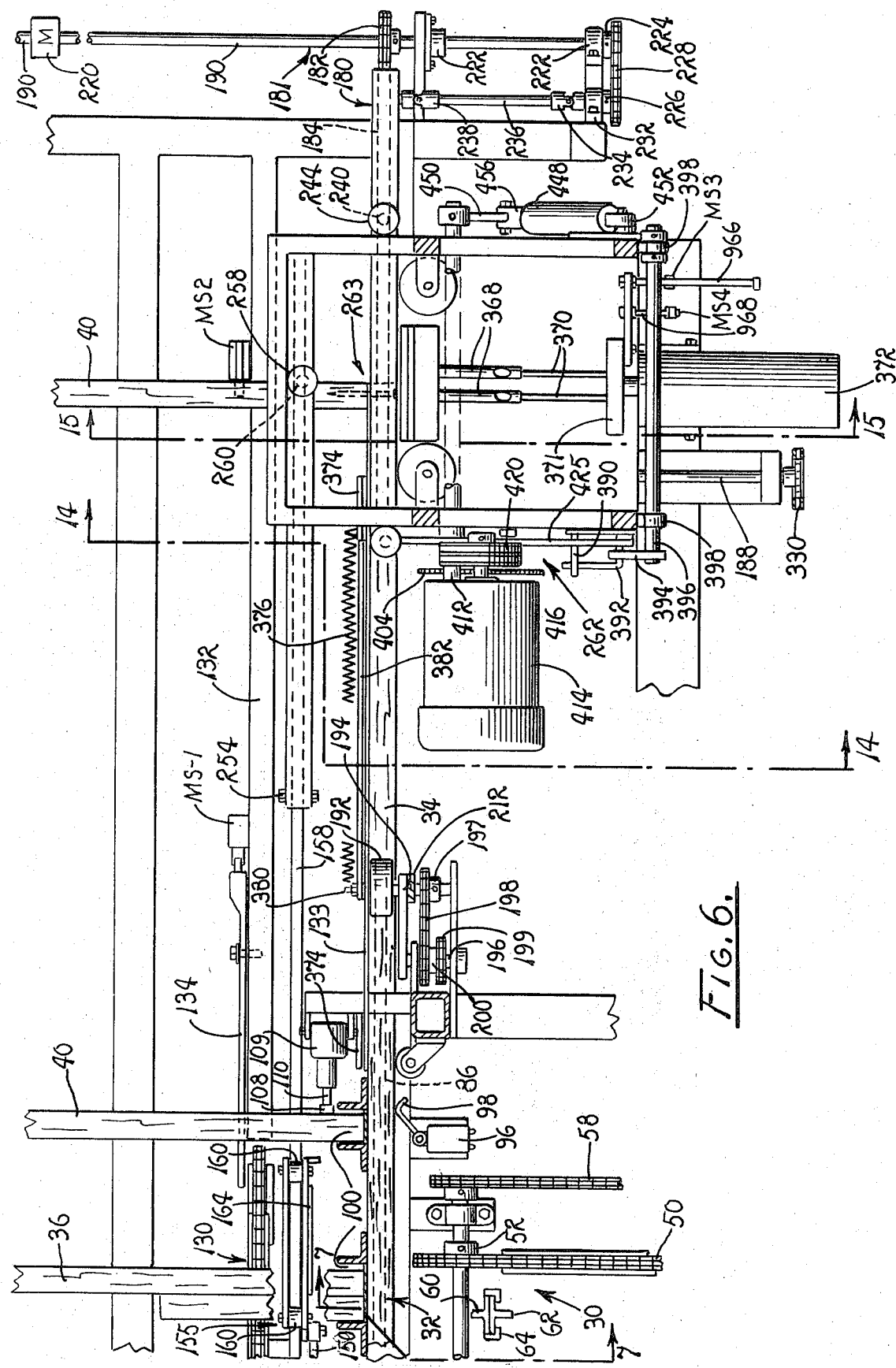
FIG. 6 is a sectional plan view taken generally along line 6—6 of FIG. 5.

In fabricating walls which are to be employed in framing buildings and the like, the various wall components, including the wall plates and the vertical structural support components necessarily must be accurately dimensioned, as well as precisely spaced within the assembled wall for meeting building code requirements, as well as for satisfying construction needs of building integrity and accuracy in construction.

Through the employment of the process and machine embodying the principles of the instant invention, it has been found that it is entirely possible and practical to reduce construction data to coded intelligence and then drive slaved, special-purpose machine systems in a manner consistent with the intelligence for fabricating wall structures which are both accurately dimensioned and structurally sound.

In practicing the instant invention, a set of engineering and architectural drawings are acquired for a given building, or group of buildings, to be constructed. This material includes specific data as to the dimensions of the walls to be constructed, the location and types of openings to be provided as well as the types of material to be employed. This data then is reduced to readily comprehensive intelligence, including the required vertical components, their relative spacing and dimensions. Thereafter, the thus provided listing is converted to electronically stored intelligence which ultimately is electronically extracted and employed in driving slaved subsystems of the machine of the instant invention for causing the machine to carry out a series of mechanical functions for assembling selected components in a manner consistent with the stored intelligence. The resulting structure is a series of completed walls, each wall being of individually determined dimensions and configurations and satisfying the requirements of acquired drawings and engineering data.

Turning now to FIG. 1, therein is illustrated a machine embodying the principles of the present invention. The machine is provided with a plurality of stations, including a component feed station 10, a component assembly station 11, a header feeding station 12, a window box inserting station 14, a router station 16, a brace inserting station 18, and a sheathing station 20.

The various stations are arranged in a serial alignment and in a manner such that various wall components sequentially are fed, partially assembled into a wall and then conveyed to a series of next-in-line stations for sequentially receiving successive operations, whereby upon an application of sheathing, applied in the sheathing station 20, there is provided a completed wall.

Of course, it is to be understood that the wall being fabricated selectively can be delivered through any of the various stations without receiving an operation, depending upon the desired status of completion required for the wall, and the ultimate configuration of the wall being fabricated.

For the purposes of storing and retrieving intelligence, numerous information storage and retrieval devices currently are commercially available. These devices include card and tape encoders, readers and data processing machines. As a matter of convenience, the instant invention utilizes intelligence storage and retrieval systems of a type which employ reelable tapes.

As best illustrated in FIG. 28, the machine of the instant invention employs a suitable tape reader 22 through which is threaded an electronically coded intelligence bearing tape 23. Since the tape reader forms no specific part of the instant invention it is illustrated in block form. However, in practice, an optical reader has successfully been employed. These devices normally include a light-responsive head and serve to extract and decode coded intelligence by delivering light through openings provided in a punched tape whereupon a supply of electrical output signals, which represents the stored intelligence, is provided. The output is then delivered to various slaved circuits through control circuits for performing selected functions. As presently employed, the reader 22 electrically is coupled with a machine control circuit 24 which utilizes the output signals derived from the reader 22 for closing a series of electrical circuits to the actuators for tape selected machine systems. In practice, the tape 23, as illustrated, is punched by a key punch operator or a suitable machine, in a prescribed manner for coding the tape with intelligence indicative of the sequence of machine events which must occur to fabricate a series of selected walls.

Since the tape reader 22, tape 23, and the machine control circuit 24 may be of any suitable design, and be varied as desired, a detailed description thereof is omitted in the interest of brevity. However, it should be understood that the tape 23 is coded through an intelligence storage system to provide signal generating indicia thereon for thus establishing the required intelligence on the face of the tape, while the tape reader 22 complements the intelligence storage system and serves to review the intelligence and deliver electrical signals to the control circuit 24 consistent with the intelligence provided on the tape. Any convenient tape advancing mechanism may be employed in feeding the tape, however, as illustrated, the tape 23 is fed between a pair of selectively driven spools 26.

The control circuit 24, in effect, includes a plurality of normally open, solenoid-operated switches which respond, or are closed to a source of electrical potential, in response to the input signals delivered by the reader 22. The output of the control circuit 24 is made up of electrical signals delivered to various circuits located throughout the machine and serve to close appropriately arranged switches for achieving desired functions at appropriate intervals.

Consequently, it should be appreciated that as the tape 23 is fed through the tape reader 22, the reader responds to coded intelligence and provides a series of electrical signals or pulses which are delivered to the circuit 24 which, in turn, completes various electrical circuits within the operative circuits of the machine for thus achieving a predetermined sequence of machine functions for thereby completing a wall in a desired or preselected configuration.

For purposes of description of the machine, unless otherwise designated, the machine elements at opposite sides of the longitudinal axis of the machine are deemed to constitute mirror images. Therefore, it is to be understood that, except where indicated, machine components are duplicates and are arranged at opposite sides of the machine to perform complementary functions.

Component Feed Station

Turning now to FIGS. 2 through 9, 12, 13 and 27, it will be seen that at the component feed station 10 there is provided a plate feed system 30, and a vertical component feed system 32 which are united into a unitary wall structure. The wall ultimately includes a pair of parallel plates 34 having extended therebetween a multiplicity of vertical support members, including a stud-block 36, a block-stud 38, a plurality of studs 40, a plurality of window boxes 42, a plurality of stud-trimmers 44, and a plurality of trimmer-studs 46. The stud-blocks and block-studs are of similar design except that they are reversely oriented. The same convention is employed in designating the stud-trimmers and trimmer-studs.

Plate Feed

The plates 34 are delivered to the machine by a plurality of parallel conveyor chains 50 arranged at opposite sides of the machine and driven in a manner such that the upper surfaces of the upper reaches thereof continuously are advanced toward the longitudinal axis of the machine, whereby plates may be deposited on the upper surfaces of the chains and indiscriminately fed to the machine to there be received.

In practice, the plates 34 are manually deposited on the chains 50, however, the plates could be delivered thereto by any suitable device including continuously actuated feed conveyors. The chains 50 are driven through a mechanism including a plurality of sprockets 52 pinned or otherwise secured to a journaled drive shaft 54. The shaft 54 is powered by a suitable electrical motor 56 coupled to the shaft through a chain and sprocket coupling 58. Of course, it is to be understood that the conveyor chains could, through suitable gearing, be driven from a common power source such as the motor 56, however, in practice, a pair of electrical motors 56 are employed in a manner such that the chains 50 at opposite sides of the machine separately are driven for randomly delivering the plates 34 to the station 10.

As best illustrated in FIGS. 7 and 8, the advancing plates 34 are intercepted and engaged at longitudinally spaced points by a plurality of stops 60. Each of the stops 60 includes a vertically supported, rigidly mounted stop finger 61 extended above the plane of the upper surface of the conveyor chain adjacent the station 10. Therefore, as the chains 50 are driven, the plates 34 are brought into a contiguous side-by-side relationship and are restrained from further advancing displacement by the fingers 61.

In order to achieve a selected feeding of the plates 34, a plurality of vertically reciprocating discharge fingers 62 are reciprocally mounted by a plurality of suitably arranged bearing clamps 64 mounted adjacent the fingers 61, at a position directly beneath the plates 34 as they are engaged by the fingers 61.

As best illustrated in FIG. 7, each of the discharge fingers 62 includes a kicker surface 66 to inclined that as the surface is brought into engagement with the lowermost surface of a plate 34, the plate is elevated and subsequently tilted toward the machine so that, in effect, the plate is permitted to roll over the upper surface of the finger 61. As a practical matter, the upper surfaces of each of the fingers 61 also are inclined toward the machine for enhancing the delivery of the plates 34.

The discharge fingers 62 simultaneously are extended and retracted relative to the surface of the conveyor chain 50 by means including a drive shaft 66 supported for rotation by a plurality of journal bearings 68. The shaft 66 is coupled through a plurality of similar drive linkages 70 to the lowermost end of the various discharge fingers. Each of the drive linkages 70 includes a radial arm-like link 72 having a first end securely fixed to the shaft 67 and adapted to be oscillated thereby. The second end of each of the links 72 pivotally is coupled to the lowermost end of one of the fingers 62 through a pivoted push rod 74. The rods 74 include suitable pivot connections at each of their opposite ends for effecting a coupling thereof between the finger 62 and the radial links 72 so that as the shaft 67 is oscillated, reciprocation is imparted through the links to the fingers 62 for elevating and retracting the kicker surfaces relative to the plane of the upper surface of the chains 50.

Oscillation is, in turn, imparted to the shafts 67 through a pneumatic, piston-type actuator 76 having a reciprocating drive shaft 78 adapted to be extended and retracted in response to alternate pneumatic pressurizations of the actuator. The distal end of the shaft 78 includes a clevis 80 pivotally coupled with the shaft 67 through a rigid crank arm 82 having one end pivotally connected at the clevis 80 and the opposite end rigidly fixed to the shaft 67. The actuator 76 is pivotally supported by a coupling 84 located at the heel thereof so that the actuator is permitted to pivot at the clevis 80 for accommodating an arcuate oscillation of the clevis 80 so that oscillation of the shaft 67 and, consequently, oscillation of the link 72 is achieved for imparting desired reciprocation to the fingers 62.

As best illustrated in FIG. 7, each of the plates 34 is delivered from the stop fingers 61 to the upper surface of an endless conveyor chain 86. Each of the chains 86 includes an upper reach extending transversely to the discharge ends of the upper reaches of the chains 50. The plane of the chains 86 is beneath the plane of the chain 50 so that as the plates are delivered by the discharge fingers 62 they are received by the upper surfaces of the chain 86. As illustrated in FIG. 9, each of the chains 86 is supported for continuous displacement by the upper surface of a laterally extended supporting track 88. The track 88 extends between a pair of support shafts 90, FIG. 3, having suitable sprockets 92 mounted thereon with the chains 86 being trained thereover. As a practical matter, various devices may be employed in driving the shafts 90. However, in practice, a continuously operable motor 94 operatively is coupled to a selected one of the shafts 90 through a convenient chain-and-sprocket coupling 95.

Therefore, it should be apparent that as the plates 34 are fed at the component feed station 10, initially they are directed along a first path, transverse to their longitudinal axes, as they are delivered by the chains 50, and then are delivered along a path extending parallel to the longitudinal axes, as they are received at the upper reaches of the chains 86 upon being discharged by the discharge fingers 62. Since the motor 94 is a continuously driven motor, the plates 34 continuously are urged to advance through a frictional engagement with the upper surfaces of the chains 86. However, in the event an obstruction is encountered, slippage or relative displacement between the lower surfaces of the plates and the upper surfaces of the chains 86 is readily accommodated.

In order to effect delivery of the plates 34, through a reciprocation of the fingers 62, there is provided a microswitch 96 having a spring-biased pivoted arm 98 disposed in the path of the plates 34 as they are advanced by the chains 86. In the absence of a plate 34 on the upper surfaces of the chains 86, the arm 98 is biased across the chain causing the microswitch 96 to close a circuit to a suitable valve, not shown, for initiating actuation of the actuator 76, whereupon the actuator 76 is caused to extend for rocking the shaft 67 causing the discharge surface 66 of the fingers 62 to be elevated for thereby delivering a plate 34 to the chain 86. Once the plate 34 is supported by the chain 86, it will be advanced past the microswitch 96 causing the circuit to open, whereupon the actuator 76 is returned to a retracted position for returning the discharge surface of the fingers below the surface of the conveyor chains 50.

Vertical Component Feed

The vertical component feed 32 includes a sequentially aligned multiplicity of transversely arranged, vertically disposed hoppers 100. Each of the hoppers 100 is of a vertical chute configuration adapted to receive therein a stack of superimposed, horizontally oriented vertical support members of a specific type. For example, the first-in-line hopper, as illustrated in FIG. 3, is adapted to receive elongated studs 40 in a superimposed relationship, while the next-in-line hopper serves to receive and retain a stack of superimposed stud-blocks 36, the next hopper receives and retains therein block-studs 38, the next hopper receives and retains stud-trimmers 44 while the last-in-line hopper serves to receive and retain trimmer-studs 46.

In order to deliver a vertical component from a selected one of the hoppers 100, each hopper is provided with a pair of vertically disposed reciprocating elevators 101 arranged therebeneath and adapted to engage the opposite ends of the components for lifting the components as they are retained within the hoppers. The elevators 101 are driven through an energization of a pair of actuators 102, of a design quite similar to the actuators 76. Each of the actuators 102 includes an output shaft 104 and a pair of parts, not designated, through which pressurized fluid operatively is delivered to one end of the actuator's cylinder, while an exhaust of pressurized fluid is accommodated at the opposite end of the cylinder for thus extending and retracting the output shaft 104.

Hence, by controlling the direction of delivery of pressurized fluid to the actuators 102, each of the shafts 104 selectively is upwardly extended or downwardly retracted for causing the elevators 101 to engage the end portions of the lowermost component for selectively lifting the stack of vertical components in the associated hopper 100. In practice, a suitable selector valve 106, FIG. 28, is provided and coupled with each actuator 102 for determining the direction of fluid flow thereto.

Control for the selector valves 106 is achieved in response to a signal delivered from the machine control circuit 24. Therefore, as a signal is delivered from the control circuit 24 to the component feed station 10, a selected actuator 102 is actuated. Of course, it is to be understood that each of the hoppers 100 is provided with a pair of simultaneously energized elevators 101 so that the component's ends are elevated simultaneously to preclude a "jam" of the feed mechanism.

As shown in FIG. 3, each of the hoppers 100 also is provided with a pair of spaced clamping feet 108, FIG. 6. Each of the clamping feet 108 includes a pneumatic actuator 109 and a reciprocating shaft 110 coupled therebetween. The feet, when extended, engage the lowermost component within the associated hopper 100. These feet are located adjacent to the ends of the hoppers and serve as pressure applicators to clamp the engaged components so that downward displacement thereof is inhibited. In practice, the actuators 109 are driven from a pneumatic pressure source, not shown, however, as presently employed, operation of each of the clamping feet 108 operatively is controlled by a microswitch 112, FIG. 5, having an actuator arm 113. Each microswitch is mounted near one end of the associated hopper 100 and is adapted to be actuated by a reciprocable actuating rod 114. The rods 114 are supported for vertical reciprocation adjacent to the ends of the hoppers 100 by suitable bearing brackets 116 having vertically aligned bores extending therethrough. Each of the rods includes a camming collar 118 fixedly secured thereto and adapted to actuate the actuator 113 of the adjacent microswitch 112. The rod 114 is biased in a downward direction by a tension spring 120 connected therewith. The spring 120 assures a seating of the rod 114 in a position to be driven into engagement with the actuator of the microswitch 112.

In order to impart upward displacement to the rods 114, each of the elevators 101 further includes a vertically extended plate 122, FIGS. 5 and 9, mounted in suitable vertically aligned tracks, not designated. Each of the plates has secured thereto an elevator link 124, FIG. 5. The link 124 extends laterally from the plate 122 and is provided with a vertically aligned opening, not designated, which receives therein the rod 114. As each elevator 101 is displaced, the plate 122 and the associated link 124 are displaced upwardly. A collar 126 is fixed to the rod 114 in a position to be engaged by the link 124 as it is displaced upwardly.

Therefore, as the elevator actuator 102 drives the shaft 104 upwardly, beneath a hopper 100, the clamping feet 108 are caused to be released, whereupon the stack of components is free to descend. However, due to the extension of the shaft 104, the components cannot descend except at such time as the shaft 104 is retracted. As the elevator 101 is retracted into a plane below the clamping feet 108, the actuator 113 of the microswitch 112 again is actuated by a release of the collar 118 fixed to the rod 114 so that the clamping feet again are actuated for engaging the adjacent component arranged in a coplanar relationship therewith. In practice, the collar 118 is so adjusted that one component, only, is permitted to drop with the elevator.

Continued downward displacement of the elevator 101 permits the elevator-supported component to be seated and supported by the upper surface of the conveyor 130. This conveyor includes a pair of continuously driven coplanar conveyor chains 131. As the components are seated on the conveyor chains 131, the elevator shaft 104 continues to be retracted therebeneath for thus accommodating a release of the vertical component for thus permitting the component to be advanced by the conveyor.

Therefore, for each cycle of operation, the machine control circuit 24 selects, in accordance with intelligence signals received from the tape reader 22, a component to be fed. As a result of this selection, the associated selector valve 106 is energized for delivering fluid through a selected actuator 102 of an elevator 101, whereupon the shaft 104 thereof is driven upwardly for engaging the lowermost component within a hopper 100. As upward displacement of the shaft is achieved, the associated rod 114 causes the microswitch 112 to be activated. Activation of this switch initiates a retraction of the clamping feet 108, whereby the feet are withdrawn from engagement with the lowermost component of the hopper 100 for thereby releasing the stack of components. As the shaft 104 ultimately descends, the microswitch 112 is again actuated, through a disengagement of the collar 118 fixed to the rod 114, for causing the clamping feet 108 to again be actuated. As the feet 108 are again actuated, the component disposed opposite thereto, which, as a practical matter, is the component supported directly above the component engaged and supported by the shaft 104, is engaged by the feet. As the elevator shaft 104 descends beneath the level of the conveyor 130, the conveyor 130 engages and advances the component in a direction transverse to the longitudinal axis of the component. Continued advancement of the component by the conveyor 130 delivers the component to a pair of support rails 132, FIG. 9, disposed in a throat defined by a pair of laterally spaced guide plates 133, FIGS. 4 and 6, which engage the end surfaces of the advancing components. A pair of switches MS1 having an arm 134, FIG. 6, are arranged adjacent the support rails, whereby as the components sequentially are advanced by the conveyor 130, they are positioned on the arms 134 for actuating the switches MS1 for thus initiating further advancement of the components from the station 10 to the component assembly station 11.

Each of the switches MS1 operatively is connected, through a circuit which includes a drum switch DS, with an hydraulic selector valve 135 which dictates activation of an hydraulic actuator 136. The actuator 136 is of a suitable type and includes a piston head to which is fixed an output shaft, not designated. In practice, a double-acting hydraulic actuator has served quite satisfactorily. The actuator 136 is connected to the machine frame at its heel through a pivoted coupling 138, and at its shaft, through a pivoted clevis coupling 140, to a crank arm 142, FIG. 4. The opposite end of the crank arm 142 is fixedly secured to an oscillatable drive shaft 144 which operatively is supported by suitable journal bearings 146.

Extending from the shaft 144, in fixed relation therewith, there is provided a pair of rigid crank arms 148. The distal ends of the crank arms 148 are pivotally coupled to a pair of drive rods 150, FIG. 4, by a coupling including pivot pins 152. Consequently, as the actuator 136 is pressurized for extending its shaft 144, the crank arm 142 is driven in rotation for thus rotating the shaft 144, whereupon the distal end of the crank arm 148 is caused to describe an arc for laterally displacing the drive rods 150, as they are pivoted about the pivot pins 152.

Each of the rods 150 is connected through a pivot 154 to a retilinearly reciprocating carriage 156. The carriage 156, in turn, is supported on suitable guide rails 158, FIG. 10, by convenient roller bearings 160 coupled thereto through pins 161. Hence, as the drive rods 150 are displayed through an oscillating displacement of the crank arm 148, the rods 150 serve to displace the carriages 156 in rectilinear displacement along the guide rails 158.

Pivotally mounted on each of the carriages 156, by a pivot pin 162, there is an elevated dog 164. Each of the dogs 164 is urged into and maintained in an operative elevated orientation by a tension spring 166 and a stop 168 fixed to the carriage 156, FIGS. 10 and 11. The dog 164 includes a planar face 170 adapted to engage a vertical face of a support member as the member is seated and supported by the rails 132. By employing a tension spring 166 for urging the dog 164 in rotation about the pin 162 and into seated engagement against the stop 168, the dog is caused to be spring-biased into an operative position, while being adapted to be depressed as it is retracted beneath the various hoppers 100. As best illustrated in FIG. 4, each of the rods 150 is adapted to be retracted for positioning the face 170 of the dog 164 just rearward of the first-in-line hoppers, while accommodating a forward displacement of the dogs 164 for advancing and positioning a selected vertical component at the component assembly station 11.

Therefore, as the vertical components are positioned by the conveyor 130, on the actuator arm 134, a closing of a circuit through the microswitches MS1 is achieved, whereupon the pusher actuators 136 are energized for operatively displacing the crank arm 142. A rate of rotation thus is imparted to the shaft 144 causing the crank arm 148 to be oscillated for advancing the drive rods 150, and therefore the face 170 of the dogs 164, into displacing engagement with the components seated on the arm 134 for thus effecting a feeding of the component from the feed station 10 to the assembly station 11.

Stud Feed

As best illustrated in FIGS. 2 and 4, the studs 40 are delivered to the component feeder 32 by a conveyor 171 of a type including an elongated endless conveyor chain 172 trained about a plurality of suitably mounted sprockets 174. As the chains 172 are advanced, the studs 40 are advanced and delivered vertically through a guide chute 176 to the hopper 100, which receives therein the studs in superimposed and stacked orientation. While the chain 172 may be continuously driven and the studs 40 gated into the chute 176, in a manner similar to the feeding of the plates 34, it has been found practical to manually energize an intermittently operable motor, not shown, for indexing the chain 172 to achieve an advancing of the studs in a direction normal to their longitudinal axes. Additionally, if desired, the studs 40 may be delivered to the chains 172 by an endless delivery conveyor 178, FIG. 2, arranged adjacent thereto and adapted to discharge onto the conveyor 171.

Conceivably, the remaining vertical components could be delivered to the feeder 32 by a conveyor similar in design to the conveyor 178, however, it has been found practical to supply the components by manually stacking the components in the hoppers 100. This results from the fact that, as a practical matter, normally the quantity of studs employed in framing a wall relatively is much greater than the quantity of any of the other single types of components employed in framing a wall.

COMPONENT ASSEMBLY STATION

Pressure Track Assembly

As the wall plates 34 are advanced by the conveyor chains 86 they are presented to the component assembly station 11. However, since the plates 34 are randomly fed, as required by the microswitch 96, positive control over the feed of the plates must be assumed since, in order for the components to be positioned at selected intervals, it is necessary that the plates be advanced through the assembly station 11 in predetermined increments. Therefore, as each of the plates 34 is delivered to the station 11, it is received within a pressure track assembly 180.

The track assembly 180 includes a drive system 181, FIG. 6, coupled with a lower endless track 182 having track-like links 183, FIG. 5, and a matching upper endless track 184. Each of the pressure tracks 180 is arranged within a plane parallel the plane of the conveyor chain 86 so that plate advancement may be accommodated. Each of the upper tracks 184 is trained about a pair of spaced sprockets 185 supported in a vertically adjustable cradle 187, while the lower track 182 is supported by a pair of spaced sprockets 186. The sprockets 186 are mounted on shafts 188 and driven by a drive shaft 190, while the sprockets 185 are supported by suitably journaled shafts 191, FIG. 12, and also are driven by the shaft 190 of the drive system 181.

The spacing between the tracks 182 and 184 may be varied as required for gripping the plates therebetween. However, it is important to understand that, due to the required accuracy, the surfaces of the links 183 must be forced into engagement with both the upper and lower surfaces of each plate 34, as the plate is advanced between the chains 182 and 184 to preclude any lost motion or tendency for the surfaces of the tracks to slip relative to the surfaces of the plates.

Hold-down Roller

As a practical matter, the upper and lower tracks 182 and 184 of the assembly 180 also serve to advance wall sections after a partial assembly at the station 11. Therefore, significant pressure is, in practice, applied at both the upper and the lower surfaces of the plates 34 to assure accuracy in wall advancement as they are advanced between the tracks.

It can be appreciated that due to the limited spacing between the tracks, it is quite difficult to insert the leading ends of the plates 34 into the space between tracks simply by driving the conveyor chains 86. Therefore, a driven hold-down roller 192 is disposed above each of the chains 86 in a position to engage the upper surface of the plates 34 as they are advanced toward the assembly 180 to force the plates 34 into engagement with the chain 86.

In practice, the roller 192 is supported by an axle at the distal end of a pivotal support 194, FIG. 12, pivoted about a pivot point 196. The roller 192 is driven through a chain drive system including a pair of chains 198 and 199, FIG. 5, interconnected through a pair of coaxially aligned sprockets 200 fixedly secured to a suitably supported drive shaft 201. The sprockets 200 are driven through the chain 199 which, in turn, is trained about a drive sprocket 202, FIG. 5, fixedly secured to a driven drive shaft 204. The shaft 204 is coupled with an idler 205 having peripheral teeth mated with the lower run of the chain 86, as best shown in FIG. 12, and adapted to be driven thereby.

In order to achieve a desired pressure for the roller 192, there is provided a piston-type pneumatic actuator 206, having a reciprocating output shaft 208 coupled through a suitable clevis 210 to vertically disposed roller actuating arm 212. In practice, the roller actuating arm 212 and the pivotal support 194 collectively form a bellcrank, as illustrated in FIG. 5. The heel of the actuator 206 is coupled with an upright frame member through a pivoted coupling 214, fixedly secured to the frame of the machine at an elevation sufficient to accommodate a downward displacement of the clevis 210, upon extension of the shaft 208, for pivotally displacing the arm 212 downwardly to achieve an oscillatory displacement of the support 194 about its pivot 196.

Control of the actuator 206 is achieved through a suitable selector valve 216, FIG. 28, actuated in response to an actuating signal delivered to the drive 181 for initiating an advance of the assembly 180.

Track Drive

The drive 181, as employed in driving the track assemblies 180 located at opposite sides of the machine, includes an electrically energizable drive motor 220 coupled with the drive shaft 190 through a suitable drive coupling 221. As best shown in FIGS. 5 and 6, each of the shafts 190 is journaled in suitable bearing supports 222 and extends outwardly from the frame of the machine. To the distal end of this shaft there is fixed a chain drive sprocket 224, FIG. 5. The sprocket 224, in turn, is coupled to a driver sprocket 226 through a drive chain 228. The sprocket 226, in turn, is fixedly secured to a drive input shaft 230 journaled in a bearing 232. The bearing 232 is suitably mounted on a vertical support beam of the machine frame, not designated. As best shown in FIGS. 5 and 6, collectively, the input shaft 230 is coupled through a universal joint 234 to a drive shaft 236 which, in turn, is drivingly coupled to a shaft 191 through a universal joint 238. By employing the universal joints 234 and 238 in driving shafts 236, the upper track 184 of the pressure track assembly 180 may be elevated and lowered for purposes of adjusting the spacing between the tracks 182 and 184 whereby the pressure applied to opposite surfaces of the plates may be varied.

Track Adjustment

In order to adjustably position the upper track 184 relative to the lower track 182, each of the cradles 187 is pivotally supported from the lowermost end of a vertically arranged pressure shaft 240. The shaft 240 is coupled with the cradle 187 by a suitable coupling, not designated, welded or otherwise suitably connected to the upper portion of the cradle 187. Each of the shafts 240 is resiliently urged downwardly by the constant pressure actuator 244 welded or otherwise supported at opposite sides of the machine frame. The actuator 244 is of a suitable design including an air-loaded dash-pot 245 having therein a spring-supported, reciprocating piston head, not shown, fixed to the shaft 240 and adapted to continuously urge the shaft 240 downwardly.

Hold-down Foot

With particular reference to FIG. 12, therein is illustrated a hold-down foot 246 having a downwardly directed sliding surface for accommodating a feeding of the vertical components as they are advanced between the parallel guide plates 133. The purpose of the hold-down feet is to assure a seating of the vertical components when they are received to be nailed. Therefore, a hold-down foot is provided at opposite sides of the machine. Each hold-down foot 246 is provided with an inclined guide plate 250 having a guide surface defining, in conjunction with the rails 132, a throat 252 for receiving the vertical components for thus assuring a seating of the component against the upper surface of the support rail 132 as the component is advanced through the machine. The opposite end of the guide plate 250 is pivotally supported by a suitable pivot 254 to a depending cantilevered beam 256, which serves to support the guide plate 250 in a selected orientation.

In order that the foot 246 continuously be urged downwardly for forcing the vertical component into seated disposition against the upper surface of the rails 132, there is provided a pneumatic dash-pot actuator 258, similar in design to the dash-pot 245, including a downwardly depending shaft 260 which is pinned to the foot 246 by means including a pin coupling 261. It is to be understood that the dash-pot 258 rigidly is supported to the frame of the machine in a suitable manner which includes welded brackets and the like, not shown.

In view of the foregoing, it should readily be apparent that as the plates 34 are fed to the component assembly station 11 they are forced downwardly by the actuators 244. Concurrently therewith, the vertical components are continuously forced downwardly by the dash-pot 258, located at the opposite sides of the machine, for thereby effecting a coplanar seating of the plates and the components. Longitudinal positioning of the components is effected by the end surface guide plates 133 which serve to guide the components as they are advanced by the pusher.

The vertical components are advanced to the assembly station 11 with their advancement being terminated at the forwardmost position of the face of the dog 164 of the pusher. At this point all relative displacement between the vertical component and its associated plate is terminated in order that the component may be joined with the plates 34 through an operation of a pair of automatic nailers 262. The nailers are arranged at opposite sides of the machine at a nailing station 263, and simultaneously drive a selected pattern of nails through the plates into the end portions of each vertical component for securing the component between parallel plates 34 at opposite sides of the machine. Once a vertical component is coupled with the parallel plates, the pressure tracks 180 are actuated for advancing the plates and, consequently, the associated vertical component from a position directly opposite the nailers 262.

Therefore, since the extent of the component advancing displacement of the dog 164 is limited by the throw of the drive rods 150, the position of the nailers 262, relative to the track assemblies 180, is fixed to coincide with the position assumed by the dog at its forwardmost position relative to the machine.

However, it can be appreciated that in order to achieve the precise spacing between the vertical components, it is necessary that the tracks of pressure track assemblies 180 advance the plates 34 in a precisely controlled manner for achieving selected spacing intervals for the vertical components. Should the pressure track assemblies 180 fail to advance the plates properly to achieve an accurate spacing of the vertical components, cumulative error necessarily is introduced in the total dimension of the wall being fabricated. Hence, it is of utmost importance that the wall plates be precisely advanced as they are delivered through the assembly station 11. Since the drive for both of the pressure track assemblies 180 is initiated through the drive of the motor 220, acting through the drive shaft 190, control over the advance of the plates can accurately be dictated by precisely controlling the duration of the period of operation for the motor 220.

In practice, the weight of the wall being fabricated is substantial, therefore the inertial effect of the load imposed on the motor, at the beginning and termination of the periods of intermittent operation thereof, creates a problem of underfeed and overfeed as the wall is accelerated to an advancing speed and then decelerated to zero speed. To overcome the problems imposed by the inertial effects of the intermittently advanced load, control over the motor 220 is achieved through a two-stage switching circuit, best illustrated in FIGS. 19 and 28.

Motor Control

In practice, the motor 220 is an electrically energizable polyphase induction motor having high starting torque characteristics. While not illustrated, the motor includes a plurality of induction or field windings which are energized for purposes of imposing a rotating magnetic field about its output rotor. By increasing the flux density of the rotating field, the speed of the motor may be varied. This is achieved by varying the number of windings which are energized at any given point in time simply by sequentially connecting a first and a second number of coils to a source of electrical potential. By sequentially energizing a second set of coils in phase with the first set of coils, an increased flux density is imposed on the rotating field for thereby increasing the torque output. Conversely, by de-energizing one set of coils, the imposed torque serves to decrease the speed of the motor. In practice, the motor 220 is energized through a suitable source of electrical potential, preferably an alternating current source, not designated, delivered thereto through a first and a second circuit switch LS2' and LS2".

As best illustrated in FIGS. 17, 18 and 19, the switch LS2' is supported for rectilinear displacement by a screw-threaded worm gear 264, having threads formed about a rotatable shaft 265, extended through an internally threaded block 266, adapted to accept the threads of the worm gear 264 in a mated relationship.

It is to be understood that the block 266 is so supported by the gear 264 that as the shaft 265 is rotated in a first direction, the worm gear 264 advances the block 266 in a first direction, and as the worm gear 264 reversely is driven, the block 266 is advanced in an opposite direction. Of course, in order to render the worm gear effective, means must be employed in supporting the block 266 against rotation, for thereby assuring rectilinear displacement as the shaft 265 is rotated. Therefore, a suitable guide rail 268, having a guide groove 269 formed therein, is arranged adjacent the block 266 and fixed thereto for limiting the degree of rotation imposed on the block. As a practical matter, a guide track 270 is seated in the groove 269 formed in the guide rail 268, in a mated relationship therewith, for thus limiting block rotation.

The switch LS2' includes an extended resilient actuating lever 272, FIG. 19, extended axially therefrom adapted to engage a rigid face of the cam 274 for effecting a closing of a circuit within the switch. In practice, the cam is stationary and the lever 272 is pivotally displaced through the camming action of the face of the cam 274.

The switch LS2", on the other hand, rigidly is mounted on a support plate 276 arranged adjacent to the path of the block 266 and includes a normally extended actuating button 278. This button is disposed within the path of a spring-biased actuating lever 280 pivotally depending from the block 266 and coupled thereto by a convenient pivot pin 282. The lever 280 is biased towards the actuating button by a suitable tension spring 284 which accommodates overtravel of the block 266.

The shaft 265 of the worm gear 264 is journaled in suitable bearings 286, located at opposite ends thereof, and is driven in rotation by a bevel gear 288 of a planetary gear 289 provided for a differential 290, journaled on the shaft 265 and extended at right angles therefrom. In practice, the gear 288 is journaled employing a stub shaft 292 fixed to the shaft 265 by a pin and sleeve coupling 293.

Hence, by driving the bevel gear 288 for thereby causing the coupling 293 to be rotatingly advanced in a first direction, the shaft 265 is driven in a first direction for causing the worm gear 264 to advance the internally threaded block 266 in a first direction. By reversing the direction of rotation imparted to the coupling 293, the block 266 is caused to be retracted or displaced in a second direction. Therefore, it is to be understood that, initially, the shaft 265 is rotated in a first direction for advancing the switch LS2' in a direction such that the lever 272 disengages the face of the cam 274 for closing the circuit to the motor 220 for thereby energizing a first set of windings within the motor whereupon operation thereof is achieved at a given output torque. Continued displacement of the block 266 effectively displaces the lever 280, relative to the actuator button 278 of the switch LS2" for thereby permitting a second circuit to close within this switch. As the second circuit closes, a second set of windings is energized within the motor 220 for thereby increasing the flux of the rotating field for thus imposing increase in motor speed and in the torque applied to the output shaft of the motor. As the speed of the motor is increased, the rate of rotation of the shaft 190 is increased to a selected rate for thus increasing the rate at which the plates 34, and the partially assembled wall, are advanced. Simply by reversing the direction of travel of the block 266, the circuit which last energized a set of windings within the motor 220 is first interrupted within the switch LS2", as the lever 280 engages the actuator button 278 for thereby opening the circuit within the switch. However, electrical energy continues to be delivered through the switch LS2' to the motor 220 for causing the motor to drive the shaft 190 until such time as the lever 272 engages the face of the cam 274 for interrupting a circuit within this switch, whereupon the motor 220 is de-energized. By controlling the duration of the energization of the motor 220 the distance through which shaft 190 drives the pressure track assemblies 180 for advancing the plates 34, relative to the nailing section 263, may be precisely controlled.

Control over the direction of rotation imparted to the shaft 265 is achieved through the use of a stepping motor 294. The motor 294 is of any suitable design, such as a DC (Direct Current) stepping motor which responds to a train of pulses suited for advancing its output shaft through a series of steps, dictated by the number of pulses delivered to the winding of the motor.

The motor 294 operatively is connected with the machine control circuit 24 through a convenient lead, not designated. The circuit 24 responds to input signals from the tape reader 22 to provide a series of pulses, the number and duration of which dictate a period during which the shaft 265 effects a closing of the switches LS2' and LS2" for directing an electrical energization current to the windings of the motor 220. This dictation is achieved through a drive train including an input drive shaft 300, to which is pinned a gear 302 drivingly meshed with a first system input gear 304 of a second differential system 306. The input gear 304, in turn, is supported by a bearing supported shaft 308 and coupled through a suitable bevel gear 310. This gear is coupled to a driven planetary gear 311 including a bevel gear 312 rotatably mounted by a stub-shaft 313 pinned to the shaft 308. The gear 312 is meshed with a coaxially aligned bevel gear 314 fixedly secured to a differential output gear 316 of the differential 306. If desired, the shaft 313 may be pinned to the shaft 308 by a pin and collar connection 315 similar to the connector 293.

The output gear 316 is journaled on the shaft 308 and serves as a means for imparting a rate of rotation to the gears 312. The combined purpose of the gears 304 and 316 is to advance the stub-shaft 313 through a circular path in order to impart a rate of rotation to the shaft 308 for thus acquiring an output rotation from the differential 306 at an output gear 318. The gear 318 rigidly is fixed to the shaft 308 through a pinned coupling 319 so that any rate of rotation imparted to the shaft 308, regardless of direction, is delivered to the gear 318.

The output rotation acquired from the gear 318 is delivered to the shaft 265, through an idler gear 320 and a meshed gear 322. The gear 322 is journaled for free-running rotation about the shaft 265 by a suitable sleeve 323. The gear 322 also has fixedly secured thereto an input bevel gear 324 mounted for rotation about the shaft 265 and meshed with the bevel gear 288. The gear 288 further is meshed with a bevel gear 326 which, in turn, is fixedly secured to an operatively fixed gear 328. The gears 326 and 328 are journaled on the shaft 265 for accommodating relative rotation therebetween.

Consequently, as the motor 294 is stepped in response to a series of pulses delivered from the machine circuit 24, a rate of rotation is imparted to the shaft 308, so long as the gear 316 remains stationary, through an advancement of the planetary gear 311. As the planetary gear 311 advances the shaft 308, gears 318, 320 and 322 are driven to impart rotation to the planetary gear 289 for effecting rotation of the shaft 265, so long as the gear 328 is fixed against rotation. Therefore, it should be understood that by securing the gears 316 and 328 against rotation, a selected rate of rotation may be imparted to the shafts 308 and 265, simply by stepping the shaft 300 through a series of pulses delivered to the motor 294 from the circuit 24. This rotation of the shaft 265 serves to advance the block 266 in a direction for initially closing the circuits of a switch LS2' and subsequently the circuit within the switch LS2''. As the switches LS2' and LS2'' sequentially are closed, the tracks 182 and 184 of the track assemblies 180 are accelerated for advancing the wall for a period determined by the duration of the operation of the stepping motor 294. By sequentially closing and opening the switches LS2' and LS2'', a two-stage acceleration is imposed on the shaft 190 for overcoming the effects of inertia.

Since the spacing between the vertical components is of primary importance, it is necessary that the electrical circuit be capable of de-energizing the motor 220 at an appropriate instant in time for terminating the advance of the wall by the track assemblies 180. This de-energization is achieved by accommodating a reversing of the direction of rotation of the worm gear 264 and, hence, displacement of the block 266. Reverse rotation is imparted to the shaft 265 through a drive train including an input drive chain 330 coupled with a suitable sprocket 332, FIGS. 5 and 17, and driven by a sprocket 333 mounted on the idler shaft 188 by means including a rigid coupling of suitable design, not designated. The drive chain 330 is coupled to the differential 306 through a suitable input shaft 334 which is journaled for rotation in a suitable bearing structure 336. To the shaft 334 there is pinned an output gear 338 meshed with the second input gear 316. The gear 338 is operatively driven in a reverse direction relative to the gear 302 as the motor 220 drives the pressure track assemblies 180, due to its coupling with the shaft 188. The gear ratio established between the sprocket 333 and gear 338 is such that the speed of the gears 304 and 316 cancel at operating speeds, due to the rate of reverse rotation.

Therefore, assuming the gear 304 remains stationary, and a reversed rate of rotation is imparted to the gear 338, a reverse rate of rotation is imparted to the shaft 265 for retracting the block 266 through the gear train employed in driving the shaft in the block extending direction. This retraction of the block 266 serves to interrupt the circuit to one set of windings for the motor 220 at the switch LS2', while continued rotation of the shaft 265 serves to retract the block in a position for forcing the lever 272 against the face or camming surface of the cam 274 for finally interrupting the circuit of the motor 220. As the circuits to the motor 220 now are opened at switches LS2' and LS2'', a driving rotation of the motor 220, and, consequently, the shaft 188, is terminated and advance of the plates 34 is arrested.

By employing a pair of differentials, a simultaneous input may be delivered from the motor 220 and the motor 294 for simultaneously urging the block 266 in opposite directions of displacement in canceling or simultaneous add and subtract modes. So long as the motor 294 is driven at a rate such that the gear 302 advances with a peripheral speed greater than the peripheral speed of the gear 338, the block 266 is extended as a consequence of a driving rotation of the shaft 265. However, as the peripheral speed of the gear 338 attains the peripheral speed of the gear 302, due to a driving of the shaft 188, stabilization of the block 266 occurs. As operation of the motor 294 is terminated in response to a cessation of the circuit 24, the peripheral speed of the gear 302 decreases relative to the peripheral speed of the gear 338, due to the continued energization of the motor 220. Therefore, a retracting displacement is imparted to the block 266 for displacing the block through a sequential circuit interrupting displacement, relative to switches LS2' and LS2''.

For purposes of adjusting the duration of plate advancement, the gear 328 is provided with a ratchet including a spring-biased lever 340 pivotally supported at a pivot pin 342 and biased into operative position by a tension spring 344. The distal end of the lever 340 includes a ratchet dog 346 pivoted thereto and so disposed as to engage the teeth of the gear 328. In practice, the teeth of the gear 328 are formed as teeth normally employed by a ratchet wheel and serves to support the differential 306 at one side thereof for accommodating an output through the shaft 265 in reverse directions.

Timing Adjustment

In practice, it may be desired to vary the timing between the opening and closing operations of the switches LS2' and LS2''. This is achieved through a gear advance 327 employed to advance the gear 328 during each revolution of the shaft 265. This is achieved simply by providing an adjustable camming collar 350 adjustably on the shaft 265. The cam 350 engages the lever 340 causing the dog 346 to advance the gear 328, during each revolution of the shaft 265, through a selected angle of rotation. A manually operable setscrew 348 is provided and mounted in a manner such that the positioning of a segmented lever may be adjusted for adjusting the throw imposed thereon by the cam 350. Therefore, by employing the cam 350, the rate at which the block 266 is advanced or retracted between the actuation of the switches LS2' and LS2" may be varied by advancing the ratchet wheel-like gear 328 through a selected angle of rotation at a given point in each cycle of operation of the cam 350 for thus causing the cam to oscillate the segmented lever 340 about the pivot pin 342.

Hence, as the plates 3 are advanced relative to the pressure track assemblies 180, a spacing between the vertical components is achieved by controlling the duration of the operation of the motor 294, in response to signals applied from the machine control circuit 24, to control the operation of the differential 290.

By way of summary, it is to be understood that at the initiation of advancement of the plates 34, the switches LS2' and LS2" are closed due to a complete retraction or seating of the block 266 and that the positions of gears 316 and 326 are fixed. At the instant a train of out signals is delivered from the circuit 24, the motor 294 begins an indexing drive of the gear train including gears 302, 304, 311, 318, 320, 322, 324 and 289 for imparting rotation to the shaft 265. As the shaft 265 is advanced, the worm gear 264 advances the block 266 for unseating the lever 272 from the face of the cam 274 for thereby closing a circuit to one set of field windings within the motor 220. As the motor is energized, for initial slow speed operation, the gear 338 is driven at a first speed, slower than the gear 302 whereby a rotation of the shaft 265 is continued even though at a lesser speed, due to the subtracting effect of the input at the gear 338, acting on the gear 316 for slowing advancement of the planetary gear 311. The continued advancement of the planetary gear 311 serves to drive the block 266 outwardly until the switch LS2" is closed whereupon motor speed of the motor 220 is accelerated. As the motor 220 comes up to operating speed, the advancement of the planetary gear 311 is arrested, due to the fully operative subtracting effect of the gear 338. Upon cessation of operation of the motor 294, a reverse mode of operation is imposed on the block 266 through the differentials 290 and 306.

Before nailing can be achieved, it is imperative that the plates be completely stationary and that the vertical components be positioned in place relative to the plates. Positioning of each of the vertical components is sensed by a pair of limit switches MS2 and MS2, FIG. 28, connected with the drum switch DS. As illustrated in FIG. 12, where only one of the limit switches is shown, it can be seen that as a vertical component comes to rest opposite the nailer 262, the operative lever of the limit switch MS2 is depressed, whereby a circuit is completed for effecting operation of the nailer. Since it is imperative that both ends of the component be properly oriented, the switches are mounted to be actuated by the opposite ends of an advancing component as it comes to rest. Additionally, it is preferred that advancement of the plates 34 cease prior to performance of a nailing operation. Therefore, the switches MS2 and MS2, FIG. 28, are connected in circuit series with the switch LS2' in a manner such that the circuit is closed through the switch LS2" to the switch MS2 when the block 266 has been fully retracted to a position for opening the circuit LS2' to the motor 220. Of course, it should be readily apparent that the switch LS2' is provided with contacts for closing a circuit to the switch MS when the button 278 is depressed.

Once a proper relative position between the plates 34 and a vertical component is assumed, each of the nailers 262 is actuated in response to the closing of the switches MS2 and MS2, as well as LS2', for advancing the drum switch DS for driving nails through the plates into the ends of the vertical components.

Nailing

While various nailing devices could be employed, each of the nailers 262 is adapted to select a nail pattern of two or four nails, depending upon the type of nailing operation to be performed. For example, if only a single stud is presented to the nailer, only two nails are required for joining the stud with the plate 34. On the other hand, where a pair of studs are presented in a side-by-side relationship, it is necessary that the nailer 262 insert a pattern including four rectangularly oriented nails for simultaneously joining both studs to the plate. Therefore, the tape 23 is provided with indicia suitable for selectively actuating the control circuit 24 for achieving a pattern selection of the nailer 262, whereby a pattern is set prior to the actuation of a nailer so that the appropriate number of nails are inserted in the stud at a given instant in time.

Basically, each of the nailers 262 includes a nail tray 352, FIG. 5, adapted for intermittent oscillation, by means not shown, to deliver nails to a pattern selector 354. The selector 354 includes four pivoted arms 356, FIG. 12, which are mounted in lateral directions. The arms, upon being pivoted, open corresponding gates for delivering the nails to nail chutes 358, FIG. 5, disposed beneath the arms. The manner in which the arms are actuated can be varied as required, however, in practice, each nailer 262 is provided with four vertically extendible fingers 360. The fingers are adapted to be elevated relative to the distal end portions of the arms 356, by electrically energizable solenoids 362, in response to signals delivered from the machine control circuit 24. As selected fingers are elevated, through a selective actuation of the associated solenoids 362, they are positioned adjacent the distal ends of selected pivoted arm 356 for establishing a nail pattern. In practice, the solenoids 362 and the fingers 360 are mounted for rectilinear reciprocation on a laterally displaceable picker bar 364 which, in turn, are adapted to be displaced by a suitable actuator 366. As the picker bar 364 is driven in a first direction, the elevated fingers engage the distal ends of adjacent arms 356 for thus causing the arms to pivot about a given pivot, not shown, whereby selected gates are opened for delivering nails through the chutes 358. As the nails are delivered downwardly, they are appropriately oriented and are seated point-first in a plurality of nail driving guides 368. The guides 368 are of tubular construction and are arranged in the path of a plurality of reciprocating, telescoping rams 370 which are inserted into the guides 368. The rams are coupled with a head 371 driven through a pneumatic actuator 372, FIG. 6, for forcing the nails inwardly through the plates 34 for joining the plates with the positioned vertical components.

Since each of the nailers 262 is of a known design and is readily interchangeable with other available nailing devices, a detailed description thereof is omitted in the interest of brevity. However, it is to be understood that each of the nailers 262 is provided with means adapted to establish selected patterns of nails, in response to an input of electrical signals, and, subsequently, to be actuated in response to an input of electrical signals for effecting a "nailing" operation. Once the nailing operation has been completed, the tracks of the track assemblies 180 are indexed for advancing the wall through a selected increment for positioning the plates preparatory to receiving the next vertical component.

It will be recalled that the guide plate 133 serves as a guide plate for positioning the ends of the vertical components as they are advanced to the nailing station 263. Consequently, as the vertical components come to rest opposite the nailer station 263, the guide plates 133 initially are positioned between the nailers and the opposite ends of the components. Therefore, means must be provided for retracting the plates from between the path of the nails as they are inserted through the plates 34 into the ends of the vertical components disposed therebetween.

Guide Plate Retraction

To achieve retraction of the guide plates 133, each is mounted for reciprocation in suitable guide brackets 374, FIG. 12, whereby rectilinear, fore and aft reciprocation may be imparted thereto. In practice, the guide plates 133 are urged forwardly into an operative disposition through the use of a tension spring 376 coupled at one end to the bracket 374, by a pin 378, and at the opposite end thereof to the plate at a suitable pivot pin 380. Retraction of the plate 133 is effected through a linkage including a reciprocating push rod 382 coupled to the plate 133, also at the pivot pin 380. Therefore, it is to be understood that while the push rod 382 advances the plate 133 rearwardly the spring 376 urges the plate forwardly into an operative, component guiding disposition.

Figure 14:
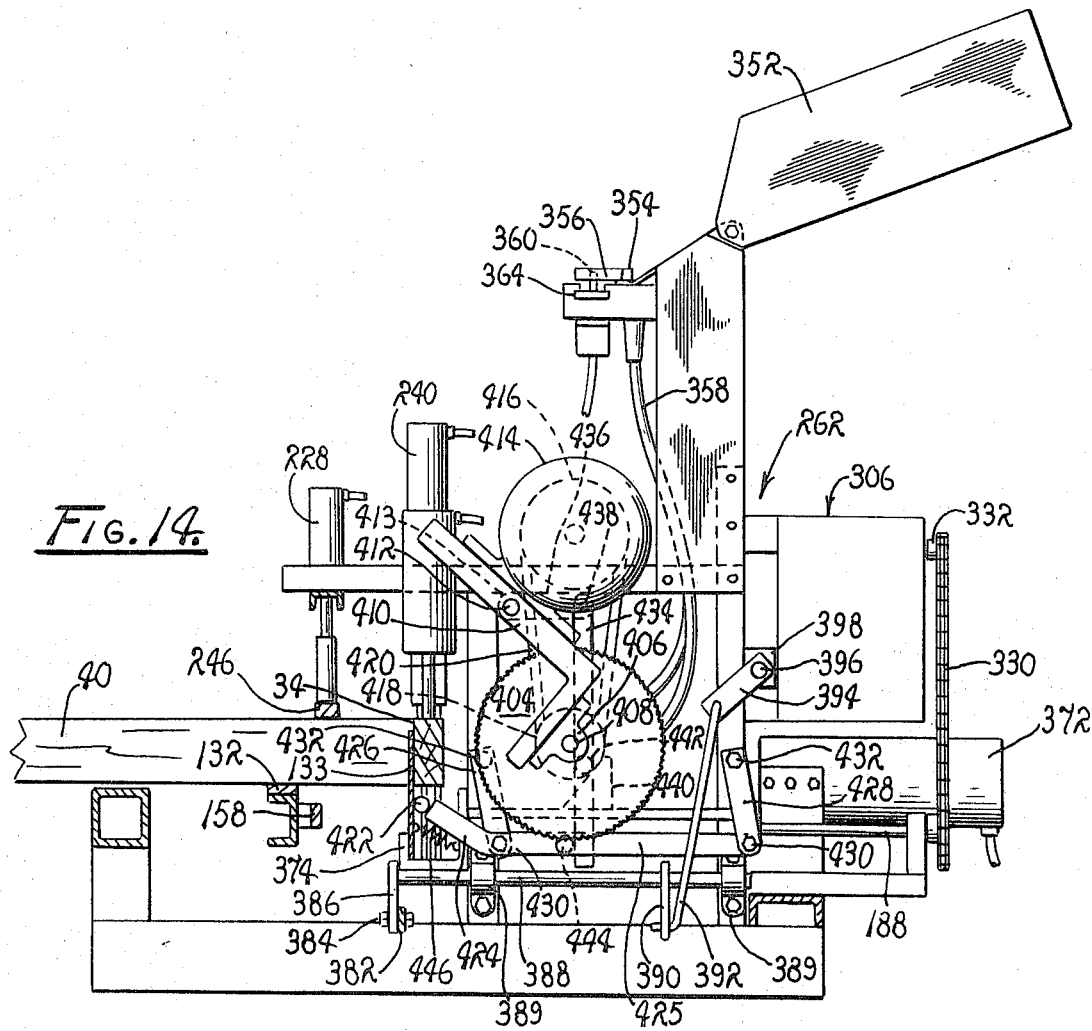
FIG. 14 is a side elevation, on an enlarged scale, taken generally along line 14—14 of FIG. 6.
Figure 15:
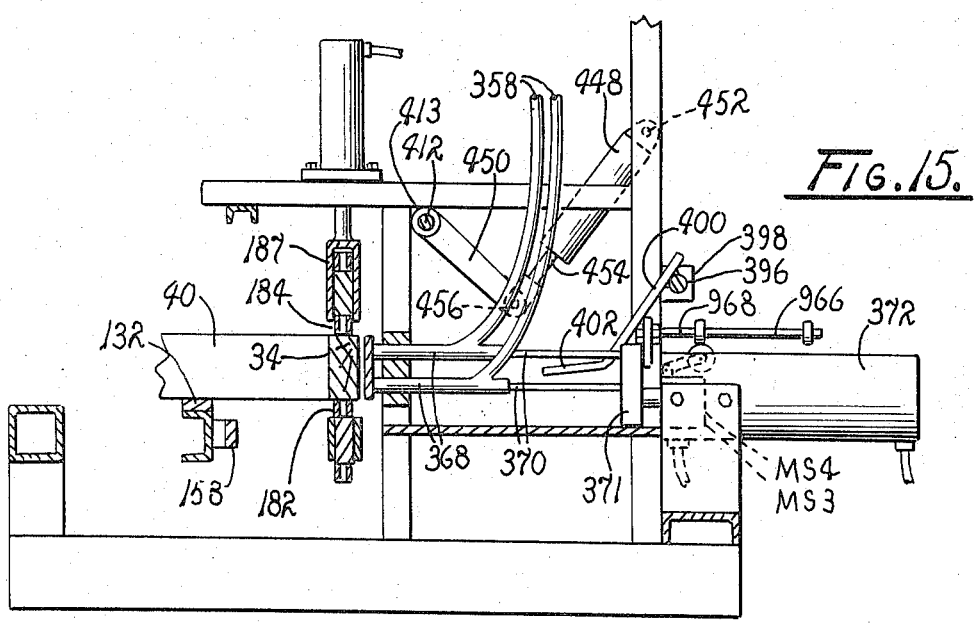
FIG. 15 is an enlarged view taken generally along line 15—15 of FIG. 6.

Actuation of the push rod 382 is achieved in response to an operative advancement of the pneumatic actuator 372 as the actuator serves to drive a selected pattern of nails into the ends of components positioned adjacent thereto. In practice, as best illustrated in FIGS. 12, 14 and 15, the push rod 382 is coupled by means including a suitable pivot pin 384 to a crank arm 386. The crank arm, in turn, is fixedly secured to a rocker shaft 388. This rocker shaft is supported by a spaced pair of suitable bearings 389, rigidly supported by the frame of the machine through suitable support means, not designated. As oscillation is imparted to the shaft 388, oscillation also is imparted to the crank arm 386 to an extent dictated by the oscillation imparted to the shaft 388. As the crank arm 386 is oscillated in a first direction, the push rods 382 are displaced in a first preselected direction for thus displacing the plate 133 in a plate retracting direction. Of course, the springs 376 are tensioned as they act against the rods 382 when the plates 133 are retracted, but as a reverse oscillation is imparted to the shaft 388, the plates are returned to an operative component guiding position. Hence, reciprocation accommodates both a guiding of the vertical components into position to be nailed and a nailing of the vertical components.

As best shown in FIGS. 14 and 15, the shaft 388 is oscillated through a crank arm 390 rigidly fixed to the shaft and extending radially therefrom. Secured to the distal end of the crank arm 390 there is pivotally coupled a push-pull link 392. The crank arm 390 is secured to the link 392 by any suitable coupling device including a right angle pin connection extended through an appropriate opening, not designated, and pinned to the crank arm 390 by any suitable pin, such as a cotter pin, not designated. The opposite end of the link 392 is pivotally connected to an oscillating crank arm 394 which is rigidly fixed to and extends radially from a shaft 396 journaled for oscillation in bearing brackets 398. As the shaft 396 is oscillated, the arm 394 is oscillated so that the end portion thereof describes an arc dictated by the extent of oscillation imparted on the shaft 396 for thereby imparting a push-pull actuation of the push-pull link 392. As a push-pull actuation of the link 392 is achieved, it is accompanied by a push-pull actuation of the push rod 382 for thereby achieving selected displacement of the plates 133.

Each of the shafts 396 is provided with an actuator foot 400 extended radially therefrom, FIG. 15. This fot extends into the path of the associated head 371 as it operatively is displaced by the associated actuator 372 for driving the rams 370 for achieving a nailing operation. In practice, the actuator foot 400 includes an abaxially extended distal portion 402 so positioned as continuously to maintain contact with the top surface of the heads 371 throughout the major portion of the reciprocating strokes imparted thereto in order that the shaft 396 is maintained in a rotated operative disposition throughout the nailing stroke of the ram 370 and permitted to return only after the head 371 has been retracted by the actuator 372. While the spring 376 is employed for displacing the plates 133, it should be understood that, where desired, the foot 400 also may be spring-biased in a selected direction for causing the shaft 396 to rotate in a direction opposite to that imparted thereto as the head 317 is extended in a nail inserting direction.

Since the operative displacement of the head 371 serves to impart oscillation to the shaft 396, it should be appreciated that through the linkage located at opposite sides of the machine both of the plates 133 simultaneously are retracted out of the path of the nails as the rams 370 are advanced in nail driving directions and, subsequently, returned for receiving a vertical component therebetween, as the rams are returned under the influence of the spring 376.

Wall Plate Severing

Upon the insertion of appropriate numbers of vertical components between the wall plates 34, it is preferred that the plates 34 be severed to a predetermined length. This is achieved by driving a circular saw 404 through the trailing portions of the plates at points determined by the machine control circuit 24, in accordance with intelligence supplied thereto through the punched tape 23.

The saw 404 is journaled, FIG. 14, and supported by a suitable bracket 406 and a driven axle 408. The axle 408 is rigidly coupled to the saw and extended into the bracket 406 in any suitable fashion. The brackets 406 operatively are supported by a terminal portion of the right angle rocker arm 410. The rocker arm 410, in turn, is rigidly secured for oscillation about the longitudinal axis of a support shaft 412, which is seated in spaced bearings 413.

It is to be understood that by imparting oscillation to the shaft 412, the rocker arm 410 causes the saw 404 to advance through the adjacent plate 34 for effecting a severance thereof. In practice, the saw 404 operatively is driven by an electrical motor 414 connected with the saw through a pair of suitable supported sheaves including driven and driving sheaves 416 and 418, respectively, interconnected through a V-belt coupling 420.

Guide Plate Displacement

As is the case with respect to the nailer 262, it is necessary to displace each of the guide plates 133 from the path of the adjacent saw 404 in order to accommodate a severance of the wall plates 34 by an operation of the saw. This is accomplished through a convenient linkage coupled to the external face of each of the plates 133 through a coupling 422 of a suitable design, which accommodates an oscillatory displacement of the plate. It is intended that the coupling 422 be displaced inwardly for tilting the associated plate and retracted outwardly for thus returning the plate 133 to a vertical disposition.

The coupling 422 for each plate 133 is driven by a bar 424 pivotally coupled thereto. The bar 424 is coupled to a drive bar 425 supported by a pair of parallel support arms 426 and 428, FIG. 14, between spaced pivots 430 while the arms 426 and 428 depend from pivots 432 secured to upright machine frame members, not designated.

The bar 425 is reciprocated by means including a vertical camming bar 434 depending from a driven lnk 436 at a pivot 438. The link 436 is rigidly secured to the shaft 412 and is adapted to be oscillated in rotation thereby. Hence, oscillation of both the links 436 occurs simultaneously with oscillation of the arm 410. The depending camming bar 434 extends downwardly adjacent to a rigid inclined cam 440 and is provided with a cam follower 442 adapted to engage and ride along an inclined face provided for the cam as the bar is displaced in vertical directions. Adjacent the lowermost end of the bar 434, for engagement therewith, there is disposed a protruding cam 444 fixedly secured to the bar. Therefore, it is to be understood that as the shaft 412 is rocked, for thus causing the saw 404 to advance toward the adjacent wall plate 34, the drive link 436 is displaced downwardly, in an arcuate path, so that the camming bar 434 is displaced vertically for causing the cam follower 442 to engage the inclined face of a cam 440, whereupon the bar 434 is pivoted at pivot 438 and the lowermost distal portion of the bar 434 is displaced and brought into engagement with the cam follower 444 for forcing the bars 425 and 424 in axial displacement for causing the associated plate 133 to pivot outwardly away from the path of the saw 404 as it is advanced by the arm 410.

Of course, it is readily apparent that the angle of the cam face of the inclined cam 440, relative to a vertical axis, will determine the extent to which the plate 133 is pivoted from the path of the saw 404. Further, in order to assure a return of the linkage for repositioning the plate 133 to a vertical orientation, a convenient tension spring 446 may, if desired, be included for causing the linkage to retract, once the bar 434 is elevated through a reverse rotation of the shaft 412 and as the saw 404 is returned to an inoperative position.

While various means may be employed for rocking the shaft 412, a pneumatic, piston-type actuator 448, FIG. 15, coupled with the shaft 412 through a crank arm 450 has been found to function quite satisfactorily. The actuator 448 is pivotally suspended at its heels by a pivoted clevis coupling 452 in a manner such that its output shaft 454 may operatively be extended for rotating the shaft 412. A pivoted coupling 456 is provided for joining the shaft 454 with the arm 450. A selective operation of the actuator 448 is acquired through a selector valve 457 coupled with the actuator in a suitable manner for dictating reciprocation of the shaft 454.

Turning, for a moment to FIG. 28, it will be noted that the selector valve 457 of the actuator 448, which serves to advance the saw 404, and the motor 414, which drives the saw 404, are interconnected with a machine control circuit through the limit switch LS2'. While not imperative, it is preferred that switch contacts be incorporated in the circuit for assuring the operation of the saw 404 only when the tracks of the assemblies 180 are totally inactive. Therefore, the switch LS2' is provided with a second pair of contacts, not illustrated, for closing the circuit to the selector valve 457 and to the saw motor 414 only when the switch LS2' is seated in a position for assuring an inactivation of the motor 220. Therefore, should the switch LS2' be closed for driving the motor 220, and, consequently, advancing the plates 34, the actuator 448 and motor 414 cannot be activated, since the energizing circuit from the control circuit 24 is interrupted at the switch LS2'.

Through the foregoing operation of the machine at the component assembly station 11, the plates 34 and the various vertical components selected and fed from the component feed station 10 are secured together and advanced from the component assembly station 11 by the track assemblies 180, to the header station 12 as a unitary wall, with the saw 404 being selectively employed to sever the wall plates 34 according to predetermined dimensions provided through an input derived from the tape 23 and fed to the machine control circuit 24.

HEADER INSERTING STATION

Also included in the intelligence punched, or otherwise encoded, on the tape 23 is instructive intelligence for imposing additional selected functions on the machine, subsequent to the component assembly at station 11, including the insertion of headers for various openings including doors, windows and the like. This is achieved at station 12.

At station 12 there is provided a pair of pressure track assemblies 500, FIG. 20. This assembly is quite similar in design and function to the pressure track assemblies 180. Since each track assembly is operated in a manner quite similar to the assemblies 180, a detailed description thereof is omitted in the interest of brevity. However, it should be understood that precise control over the wall feeding function is acquired at the station 12 by employing the assembly 500.

Above each track assembly 500 there is provided a header feeder 502 into which are stacked a plurality of pre-dimensioned headers 504. It is intended that the headers operatively be deposited between the plate 34, which serves as the upper wall plate, and the adjacent ends of the trimmers coupled with the stud-trimmers 44 and trimmer-studs 46 supplied by the station 10 and included as vertical components of the wall at station 11. The feeder 502 is quite similar in design to the hoppers 100 of station 10, except that it is so oriented as to have its longitudinal axis extending parallel to the path of the advancing wall, rather than transversely of the longitudinal axis.

The header feeder also employs elevators quite similar to the elevators 101, which are employed in feeding the components at station 10, for positioning the headers 504 in appropriate positions on the trimmers. Since the feed mechanism employed at the station 10 has been described in detail, a detailed description at this point is omitted in the interest of brevity. However, it is to be understood that the plate 122 includes two separate and operatively abutting members, which, for the sake of simplicity, are not shown, adapted to be spaced when the elevator is lowered for accommodating passage of the wall.

The tracks of the assemblies 500 are driven through a suitable drive train including an electrically energizable motor 503 coupled with the tracks through a shaft and sheaves, similar in design and function to those employed in driving tracks 182 and 184.

In order to appropriately position the wall to receive the headers 504, a limit switch LS3, similar to the switches MS1 and MS1, is disposed in the path of the advancing walls in a manner such as to extend its operative arm to be engaged by the wall as it is advanced by the tracks of the assemblies 500.

However, in order to achieve a feeding of a header from the feeder 502, a signal is delivered from the machine control circuit 24 to a control circuit 508 connected in circuit series with the limit switch LS3. The limit switch is connected through a suitable circuit with the motor 503 so that as the control circuit 508 is activated, the closing of the limit switch LS3, through an engagement with the advancing wall, serves to interrupt a circuit to the motor 503 of the drive train for the track assemblies 500 for thus deactivating the motor and thereby arresting wall displacement. Simultaneously, actuation of the elevator 501 for lowering a head in place is achieved through a closing of the switch LS3 to a selector valve 509.

Due to the normal massiveness of the headers 504 there is a tendency for the headers to "seat" under their own weight. Therefore, by properly dimensioning the headers they may be "dropped" into position relative to the ends of the trimmers. As the headers are seated, a pair of switches HS1 are engaged thereby and closed in response to the weight of the delivered header. As the switch HS1 is closed an actuator 510, FIG. 21, of a nailer assembly is actuated, through a selector valve 511, FIG. 28, for extending the shaft 512 of the actuator 510. The distal end of the shaft 512 is coupled through a convenient pivoted coupling 514 to a pivotally supported nailer 516 mounted on suitable trunions 518. The nailer 516 may be of any convenient design, however, a pair of operatively coupled, pneumatic nailers may be coupled for simultaneous operation so that depression thereof, by the actuator, is accommodated. Consequently, the resulting nailer operatively is depressed in pivotal rotation about the trunions 518, for causing the nail inserting heads of the nailer to be properly positioned relative to the adjacent trimmer-stud and the stud-trimmer which are located at opposite sides of the delivered header 504.

As the nailers 516 operatively are pivoted about their trunions 518 each is activated through suitable linkages, including stops 520, for initiating an insertion of a nail through the adjacent studs and into the header 504. As a practical matter, the nailers 516 are "ganged" so that a plurality of nails are simultaneously driven through the studs into the header in a single operation and in a desired pattern. A limit switch, not shown, is mounted on the stop 520 and is incorporated in the nailer 516 to detect completion of the driving of nail insertion operations, whereupon a signal is delivered back to the selector valve 511 for effecting an elevating of the head of the nailer. As the nailer head is elevated, a limit switch HS2 is actuated for closing a circuit to the motor 503 for causing advancement of the tracks of the assemblies 500 to be resumed for advancing the thus completed wall from the station 12 to the adjacent window box inserting station 14.

As a practical matter, frequently a header 504 will not be required for a given wall, and, in such instances, no signal will be delivered from the control circuit 24 to the control circuit 508. Therefore the actuation of the limit switch LS3 is ineffective for interrupting the advance of the pressure tracks of the assemblies 500 so that operation of the elevators 501 will not be initiated.

While not shown, it is to be understood that in the event difficulty is encountered in seating the headers on the distal ends of the trimmers, the nailers 516 may be displaced from adjacent the feeder 502 so that nailing may be achieved at a second station with the headers being seated by mechanisms employing hydraulic rams being adapted to seat the headers on the trimmers. However, as a practical matter, the weight of the header is, in most instances, sufficient to cause the header to seat on the trimmers as it is fed from the header feeder 502, particularly in those instances where both the headers and trimmers are appropriately dimensioned.

WINDOW BOX INSERTION STATION

The window box insertion station 14, as best shown in FIG. 22, includes a conveyor 600, which serves to receive advancing walls from the assemblies 500 of the header station 12 and serves to intermittently advance the wall through the station. The conveyor 600 is of any suitable design, however, a pair of parallel chains including vertically extended dogs 602 serves quite satisfactorily for this purpose. The chains simultaneously are driven through a drive train 604 of a suitable design which includes an electrically energizable motor 605, similar in design to the motor 503. This motor, in turn, is connected with a limit switch LS6 of a design and function quite similar to the switch LS3.

The window boxes 42 are delivered serially from the opposite sides of the conveyor 500 by transverse conveyors 606, as best illustrated in FIG. 22. Each of the conveyors 606 preferably is a gravity conveyor including suitable rollers 607. A solenoid operated, reciprocating stop 608 is disposed at the discharge ends of each of the conveyors and serves as gates for accommodating a release and passage of the window boxes from the conveyor. In practice, the gates are mounted for reciprocation by suitable bearing structure, not shown, and are responsive to an actuation of the solenoids 610 for effecting release of the window boxes.

As a practical matter, the window boxes 42 are directed and are delivered to the conveyors 606 by any suitable means, including a manual operation. In order to deliver the window boxes 42 from the conveyors 606 to appropriate dispositions relative to the studs and plates of an advanced wall, a pair of movable stops 612 are provided in the path of the boxes as they are delivered. The stops are so positioned as to arrest lateral displacement of the window boxes, relative to the wall, for causing them to "drop" into place as they are delivered by the conveyors 606. As the window boxes are delivered transversely above the conveyor 600, they are permitted to seat within the wall and to be retained therein. While not mandatory, it is preferred that a pressure assembly be provided for assuring a seating of the window boxes 42 within the wall, between selected studs. Therefore, there is provided a pair of fluid actuated rams 614 supported by suitable means, not designated, having laterally extended feet 616 adapted to be driven by the rams for seating the window boxes.

Mounted on each of the movable stops 612 there is a limit switch WS1 which, when depressed, serves to actuate the pair of seating rams 614 through an actuation of a selector valve 617, coupled with a pressure system, not shown, suitable for driving the pair of feet 616 downwardly to engage and force the window boxes into a seated disposition.

Once the window boxes 42 are seated, four pairs of "ganged" nailers 618 are provided and employed for joining the window boxes with the advanced wall. Each of the nailers is mounted on a suitable trunion 620 in a manner similar to the mounting of the nailers 516 employed at the header inserting station. The pairs of nailers 618 pivotally are driven through a suitable supporting linkage, including bracket links 621 and actuators 622 adapted to depress the nailers into operative position.

Control of the actuators 622 is achieved through a plurality of selector valves 623 and a plurality of limit switches WS2 which are depressed as the window boxes are seated and function to close a circuit to the selector valves 623 for causing the nailers 618 to be depressed about their trunions 620 into an operative position.

As the nailers are depressed, they are actuated through suitable linkages, not shown, for inserting nails as required. As a practical matter, each of the nailers 618 is provided with suitable limit switches, also not shown, which serve to reverse the direction of activation of the actuator 622 for causing the nailers 618 to be returned to an inoperative position once the nailing operation is completed. As the nailers are returned to an inoperative position, a plurality of limit switches WS3 are actuated for re-closing the drive circuit for the motor 605 for thereby activating the drive train 604 to effect an advancement of the wall having window boxes inserted therein to the adjacent routing station 16.

It is to be understood that initiation of the window box inserting operation is achieved in response to an intelligence signal delivered to a control circuit 624, from the machine control circuit 24, all in a manner similar to that described with respect to the header insertion operation. The circuit 624 operatively is associated with the limit switch LS6. In the event no signal has been delivered from the control circuit 24 to the control circuit 624, operation of the limit switch LS6 is rendered ineffective and the conveyor 600 continues to deliver the wall through the station 14. However, in the event a window box is required as determined by the intelligence of the tape 23 and dictated by the control circuit 24, a closing actuation of the limit switch LS6, by the advanced wall, serves to initiate operation of the machine for selectively inserting window boxes at opposite sides of the wall being delivered through the station 14 by the conveyor 600.

Once the window boxes have been seated and nailed in response to an actuation of the various nailers, the conveyor 600 is reactivated, through a closing of the switch WS3, so that the conveyor 600 now serves to deliver the wall to an adjacent conveyor 700 which traverses the adjacent routing station 16.

THE ROUTER STATION

Figure 23:
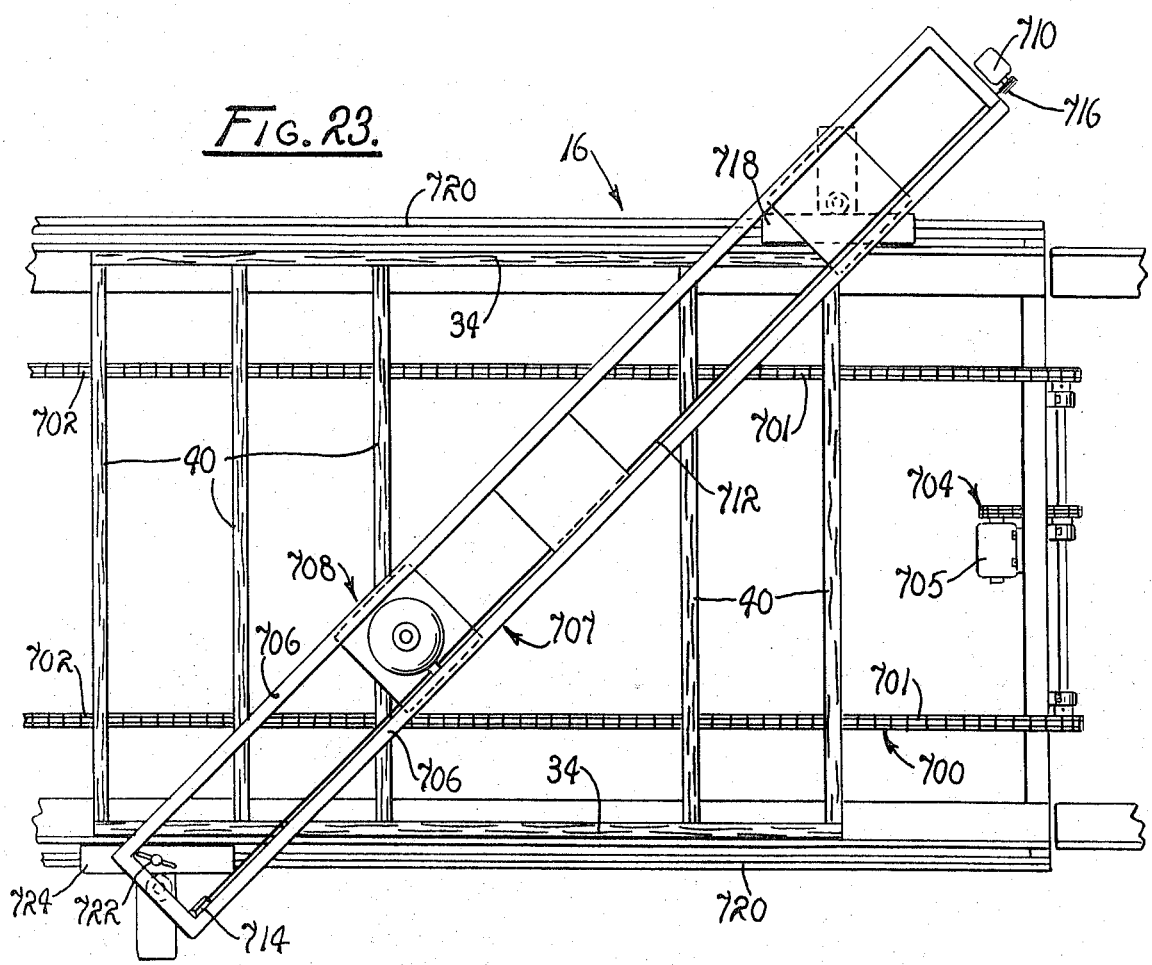
FIG. 23 is a top plan view of a router employed in routing the studs and stud-trimmers for receiving a let-in brace therein.
Figure 24:
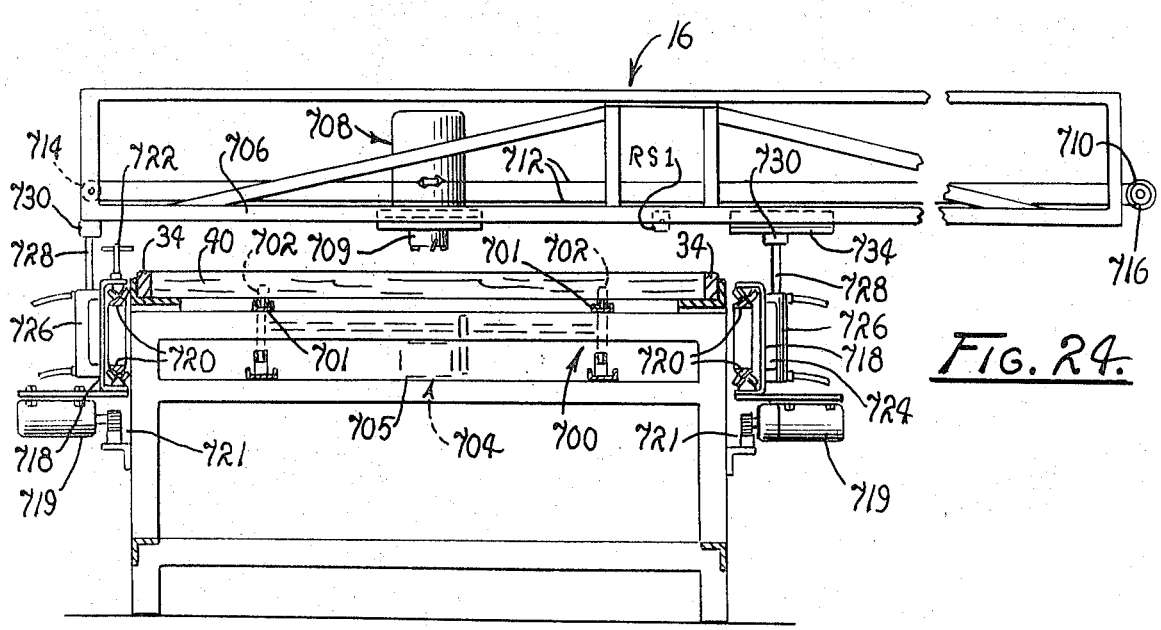
FIG. 24 is an end elevation of the router shown in FIG. 23.

Turning now to FIGS. 23 and 24, it will be seen that the conveyor 70 at the routing station 16 also includes parallel chains 701 having appropriately formed dogs 702 mounted thereon and oriented in a wall engaging and advancing disposition. The chains are driven through a drive train assembly 704, of any suitable design, including a motor 705, which selectively is activated for advancing a wall through the routing station 16.

Above the conveyor 700 there is provided an adjustable router supporting structure including a pair of parallel, laterally extended guide rails 706 supported by a truss 707. These rails operatively support a laterally displaceable router 708, of any suitable design, including a router blade 709. The router is mounted for displacement in a plane parallel the plane of the wall advanced by the conveyor. In practice, the router 708 operatively is advanced in opposite directions by a reversible motor 710 acting through an endless cable 712 trained about conveniently supported idler sheaves 714 and a drive sheave 716. Hence, it is to be understood that as the motor 710 is activated, for driving the sheave 716 in a selected direction, the router 708 is advanced across the width of the conveyor 700 and, consequently, across the wall supported by the conveyor. The motor of the router 708 operatively is powered from a suitable source of electrical energy, not shown, which serves to drive the router blade 709 by imparting driven rotation thereto for forming recesses in the vertical components sufficient to receive diagonally disposed let-in braces, the purpose of which is to impart rigidity to the resulting wall structure.

Near the opposite ends of the rail-supporting truss 707 there is provided a mount 718 and an electrically energizable motor 719 slidingly supported for displacement along longitudinal support rails 720. The motor 719 includes rack and pinions 721 for achieving adjustment. The rails 720 are extended along opposite sides of the routing station 16 while each mount 718 includes a setscrew 722 to be tightened for securing the mount 718 relative to the rails 720. A mounting bracket 724 is coupled with the mount 718 and serves to support a vertically disposed pneumatic actuator 726. Each of the actuators includes an axially displaceable piston defining an expandible chamber, the pressurization of which is controlled by a single selector valve 727. Extended from the piston head is an upwardly directed, axially displaceable shaft 728 coupled to the truss 707 by a suitable swivel coupling 730 which accommodates a pivoting displacement of the truss relative to the longitudinal axes of the shafts.

The truss 707 is adapted to pivot about the swivel coupling 730 at the opposite ends thereof, while a channeled bearing bracket 734 is provided at one end portion of the truss for slidingly supporting the truss for accommodating transverse displacement of the truss relative to the rail 720 as the position angle of the truss, relative to the longitudinal axis of the wall, is adjusted. Hence, by pivoting the truss about the swivel coupling 730, and by shifting the position of a mount 718 along the rails 720 through a selective activation of the motor 719, it is possible to adjust the path to be traversed by the router 708. Furthermore, by simultaneously activating the pair of actuators 726, through the selector valve 727, for thus extending and retracting their shafts, lowering and elevating the truss 707 and, consequently the blade 709 of the router 708 is achieved. Thus, the blade 709 of the router is lowered into an operative position, preparatory to traversing the adjacent surface of a wall, in a plane parallel to the plane of the wall, and is elevated for a return to its initial or starting position upon completion of the routing operation.

A limit switch LS10 is provided adjacent the path of the wall as it is advanced through the routing station 16. This switch is mounted in a manner such that its actuating lever is disposed in a wall intercepting disposition, in a manner similar to switches LS3 and LS6. The switch LS10 is connected with the motors 705 and 710, as well as a solenoid of the selector valves 727. Hence, the actuation of the switch LS10 serves to interrupt the operation of the driving function of the motor 705 for thus arresting advancement of the conveyor 700, in a manner similar to that heretofore described with respect to the control imposed on the conveyor 600. As the conveyor 700 comes to rest, the motor 710 simultaneously is activated, in response to the actuation of the switch LS10, for initiating a driving translation of the router 708 along the rails 706 and, concurrently therewith, the motor of the router 708 is energized for effecting a rotation of the blades 709, as the selector valves 727 for the actuators 726 are activated for lowering the truss 707 and the router into an operative disposition relative to the wall.

A control circuit 735, quite similar in design and function to the circuits 508 and 624, is provided for rendering the switch LS10 operative when a routing of the vertical components of a wall at the routing station 16 is to be effected, while rendering the operation of the switch ineffective when no routing is to be performed, as determined by the intelligence provided by the tape 23.

Therefore, it should be appreciated that as the control circuit 735 is energized, in response to an input from the circuit 24, the switch LS10 is rendered operatively effective for arresting displacement of the wall and dropping the router 708 into an operative engagement with the vertical components of the wall, while simultaneously energizing the motor of the router and initiating the driving operation of the motor 710 for advancing the router along the rails 706. Where desired, brakes of any suitable design, such as well-known magnetic brakes, may be employed for assuring the advance of the conveyor is arrested prior to the operation of the router 708. However, as a practical matter, there is very little likelihood that significant overrun of the conveyor 700 will be experienced sufficient to warrant inclusion of brakes.

Once the router 708 has completed an operative translation of the wall, it is preferred that the router 708 be returned to its initial position. This is achieved simply by employing an adjustable positioned limit switch RS1 arranged adjacent the path of the router in a manner such that its operative lever is adapted to be activated by the router as the router completes its translation of the wall. The manner in which the switch RS1 is mounted is a matter of preference, however, it is important that the switch be adjustably supported in order that the cutting stroke of the router may selectively be varied. The output signal derived from the switch RS1 is delivered to the router 708 for de-energizing its motor, to the selector valves 727 for the pneumatic actuators 726, for effecting a truss elevating operation thereof, to the motor 710 for reversing the direction of the drive applied to the sheave 716, for returning the router to its initial position, and to the motor 705 and drive train 704 of the conveyor 700 for reactivating and causing the conveyor 700 to advance. As the conveyor 700 again is activated, the wall is advanced from the routing station 16 with a plurality of diagonally aligned recesses being formed in each of the vertical components intercepted by the rotating blade 709 of the router 708.

Of course, in the event no let-in brace is required, no signal is delivered to the control circuit 735 and, consequently, the conveyor 700 remains activated for delivering the wall therethrough in an uninterrupted fashion.

As the conveyor 700 delivers the thus completed wall from the routing station 16, the wall is received by a conveyor 800 driven by a drive train, including an electrically energizable motor 801 at the brace inserting station.

BRACE INSERTING STATION

Turning to FIGS. 25 and 31, therein is illustrated a laterally disposed hopper 802 which is employed for serially delivering the braces from a stack of let-in braces to recesses formed by the router at station 16.

The hopper 802 is supported at one end by a pivoted support 804 mounted on a sliding bracket 806. The bracket 806, in turn, is mounted for longitudinal displacement along a suitable support rail 808 in a manner quite similar to that employed in supporting the mount 718, as employed at the routing station 16. The opposite end of the hopper 802 operatively is supported by a pivoted support 810, which is vertically supported by a sliding bracket 812 mounted on a guide rail 814, also in a manner quite similar to the mount 718, as employed at the routing station. As a practical matter, each of the brackets 806 and 812 is provided with an assembly 815 which includes a motor and an associate rack and pinion for achieving angular adjustment. A plurality of setscrews, not shown, are provided for fixing the position of the bracket relative to the guide rail in a manner similar to that employed in positioning the router.

Near the opposite end portions of the hopper 802 there is provided a pair of solenoid actuated support fingers 816. These fingers are positioned, through an employment of adjustable brackets, not designated, at selected locations along the lower plane of the hopper in order that the fingers simultaneously are extracted from beneath the hoppers for accommodating a downward discharge of the braces supported thereby. A pair of solenoids 817 are provided and operatively coupled with the fingers for achieving an actuation thereof. Also coupled with the hopper 802 is a pair of clamping feet 818 quite similar, in design and function, to the clamping feet 108. The feet operatively are actuated through suitable pneumatic actuators 820 and are controlled by a microswitch BS1 associated with the fingers 816 through control linkage 822. The microswitch BS1 operatively is coupled between the actuators and the fingers. While the manner in which the fingers 816 and feet 818 are interconnected may be varied, it is to be understood that as the solenoids 817 are actuated for extracting the fingers 816 from beneath the lowermost brace contained within the hopper 802, while the clamping feet 818 simultaneously are urged into clamping engagement with the next-in-line brace supported within the hopper, in response to actuation of the switch BS1 through the linkage 822. As a practical matter, the linkage 822 is quite similar to the rod 114. As the solenoid 817 returns to a seated position, for thus repositioning the fingers 816, the clamping feet 818 are caused to retract for accommodating a dropping of the stack of braces into a supported engagement with the repositioned fingers 816.

If desired, the adjustable brackets 806 and 812 may be positioned by the assembly 815 in response to an output from the machine control circuit 24, however, and as a practical matter, since the braces normally are inserted at somewhat a uniform angle, manual control thereof readily can be employed for positioning the brace dispensing hopper 802 across the wall at an appropriate angle.

Nailing

In addition to depositing the braces, it frequently is desirable to incorporate means for nailing the deposited braces within the recesses formed by the router 708. This is achieved simply by providing, at the downstream side of the hopper 802, a plurality of spaced trunions 826, adjustably supported by a plurality of brackets 828, as shown in FIG. 30, each pivotally supporting a pneumatic nailer 830 therein. The spaced nailers are conveniently "ganged" together, through a pivoted linkage 832, for simultaneous oscillation into operative disposition. Consequently, a pneumatic actuator 834 operatively is coupled with the linkage 832 for operatively pivoting the nailers into a selected disposition relative to the let-in brace deposited in the router-formed recesses, whereby a nailing operation may readily be achieved for securing the brace with the recesses.

In order to provide for a selective delivery of the brace to the recesses formed in the walls, as well as to nail the braces therein, the conveyor 800 is provided with a limit switch LS12 similar in design and function to switch LS10. This switch is connected with the motor 801 of the drive train for the conveyor, and so positioned relative to the conveyor as to effect an arrest of the operation of the conveyor's drive train at an appropriate location, when required to do so in accordance with a signal from a control circuit 24. The circuit 24 is coupled with a limit switch control circuit 835, in a manner similar to that aforedescribed, with respect to the circuit 735 of the routing station. Once a wall being fabricated is positioned beneath the hopper 802, the limit switch LS12 delivers a control signal to activate the solenoids 817 for displacing the fingers 816 and effecting an actuation of the clamping feet 818 through an operation of the limit switch BS1. The operation of the hopper 802 is quite similar to the operation of the hoppers 100, therefore a detailed description is not believed necessary. However, as the fingers 816 are displaced, the feet 818 engage the stack of braces until such time as the fingers are repositioned.

As a brace is delivered from the hopper 802, it is caused to engage and actuate a limit switch BS2, mounted on the hopper adjacent the path of the brace. This switch is connected with the motor 801 of the drive train through a suitable time delay mechanism TD, whereby the conveyor 800 is stepped through a predetermined distance for thus causing the wall to advance a predetermined distance. This stepping or indexing of the conveyor serves to position the braces directly beneath the ganged nailers 830. As the indexing advance of the conveyor 800 is terminated, an electrical signal derived from a suitable source is delivered to the actuator 834 for initiating operation of the actuator to effect a rotation of the nailers into an operative position for effecting a nailing operation.

Again, as is the case with the nailers hereinbefore described, completed nailing operations are detected through suitable limit switches, not shown, for reinitiating the advancing operation of the conveyor 800. Once the conveyor 800 is reactivated it serves to deliver the thus completed wall to an adjacent conveyor 900 at the sheating station 20.

Again, in the event no signal is received from the machine control circuit 24, the control circuit 835 is rendered inactive, whereby actuation of the limit switch LS12 is rendered ineffective and conveyance of the wall through the brace inserting station 18 occurs without interruption.

SHEATHING STATION

Figure 26:
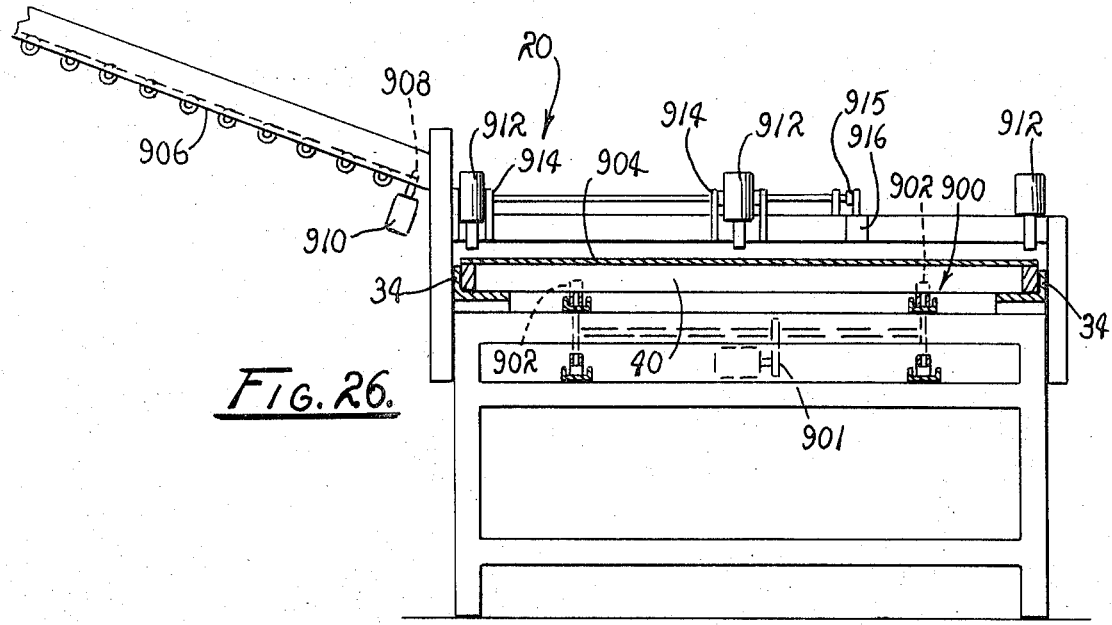
FIG. 26 is an end elevation of a sheathing feeder employed in feeding the sheathing at the sheathing applicator station illustrated in FIG. 1.
Figure 27:
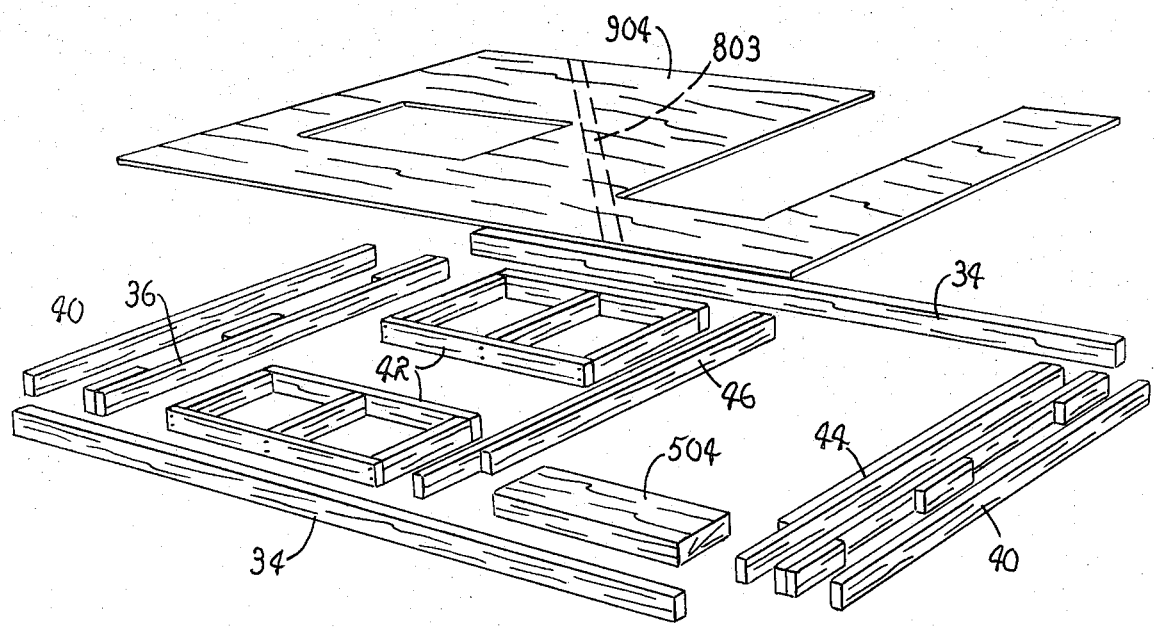
FIG. 27 is an exploded perspective view of an assembled wall fabricated employing the machine of the instant invention.

The machine structure employed at the sheathing station 20, FIG. 26, for delivering sheathing to the wall is quite similar in design to the window box insertion station, as illustrated in FIG. 6.

As the wall is conveyed from the brace inserting station 18 to the sheathing station 20, it is received by a conveyor 900, including a drive train having a motor 901 quite similar in design and function to the conveyor 800. This conveyor includes dogs 902 similar to the dogs described in conjunction with the window box insertion station 14. As in the case with the window boxes 42, the sheets of sheathing 904 are supported on an inclined gravity driven conveyor 906. Feeding advancement of individual sheets are intercepted by a reciprocating gating finger 908. The finger 908 is controlled by an actuator 910, in a manner quite similar to the operation of the gate 608, as employed in delivering the window boxes, therefore a detailed description of the fingers 908 is omitted.

Mounted adjacent the sheathing station 20 there is a plurality of pneumatic nailers 912 which are mounted at selected locations and employ trunions 518 in a manner similar to that heretofore described with respect to the mounting of the nailers 830, 618 and 516, employed at various stations and adapted to be pivoted into an operative disposition through a plurality of actuators 916, all in a manner heretofore described, with respect to the nailers of stations 12 through 18, for effecting a nailing operation at selected points.

In practice, each sheet of the sheathing selectively is dimensioned and provided with suitable openings prior to its being fed to the station 18. However, if desired, solid sheets of sheathing may be delivered to the wall and subsequently "cut-out," if desired, through an employment of any suitable cutting means. As a practical matter, quite often the specific wall being fabricated will not require openings defining windows or doors and in these instances the sheathing may be readily applied.

Mounted adjacent the sheathing station and connected with the actuator 910, there is provided a limit switch LS14 which is connected with the motor 901 and the actuator 910. The switch LS14 senses the presence of a wall at the station 20, adjacent the gating finger 908. As the limit switch LS14 is actuated by the advanced wall, the motor 901 is de-energized for arresting its advancement, while the actuator 910 is energized for withdrawing the fingers 908 from a blocking disposition relative to a supported sheet of sheathing 904 supported thereby. At the instant the fingers are withdrawn, the sheathing is delivered, by gravity, downwarly from the conveyor 906 into a seated disposition across the top of the advanced wall. Adjacent the wall, mounted on the frame and in the path of the sheet being delivered, there is provided a limit switch SS1 operatively associated with the actuators 916. This switch serves to sense the seating of the sheathing and initiate the nailing operation. As the limit switch SS1 is activated, the actuators 916 are energized for pivoting the nailers 912 into an operative position through the linkage 915, whereupon the nailers 912 are activated in a manner similar to that heretofore described. In response to a completion of the nailing operation, the nailers are returned and the conveyor 900 is again activated, in a manner similar to that heretofore described, for conveying a completed wall from the sheathing applicating station 20.

In practice, a control circuit 920 also is provided for assuring operation of the switch LS14 in a manner quite similar to that heretofore described with respect to the circuits 835, 735, 624 and 508. Therefore, a detailed description is omitted

MACHINE CONTROL CIRCUIT

The circuit employed in imposing selective machine control heretofore has been described. However, at this juncture, it is deemed advisable further to describe the circuit in still greater detail.

As heretofore discussed, the tape 23 is coded, employing any one of several suitable coding techniques, and is fed through a compatible tape reader 22 which deciphers the coded tape and delivers a series of electrical impulses or output signals to the machine control circuit 24. The circuit 24 is of a design compatible with the tape reader. Normally such circuits include a plurality of electrical switching circuits adapted to complete selected circuits in response to input signals delivered thereto from the tape reader. Normally, the switching circuits of the control circuit 24 are closed through a plurality of solenoids, each of which is driven in response to an input of an electrical pulse of a given voltage level. In any event, it is to be understood that the machine control circuit 24 selectively delivers command signals to the various machine stations in accordance with the intelligence borne by the tap 23, as deciphered by the reader 22.

While numerous functions are initiated by the variously employed microswitches, as hereinbefore described, by way of summary, it is noted that the control circuit 24 primarily is devoted to initiating selected functions at appropriate intervals during each cycle of operation for the machine. This is achieved by initiating a feeding operation at the station 10, selecting and establishing selected nail patterns for nails to be driven during each cycle of the operation, selectively advancing the walls through the stations and driving the saw 404 when appropriate. Further, the tape 23 is encoded so that during selected cycles of operation the various control circuits 508, 624, 735, 835 and 920 are activated, as required by the intelligence stored on the tape.

Each machine cycle is initiated by providing a command signal to the feed station 10 whereat a selector valve 106 is actuated for delivering a selected vertical component, as dictated by the intelligence of the tape 23. In response to an operative actuation of the selector valves 106, a selected elevator 101 is rendered operative for effecting a downward feed and forward delivery of the selected component. As the selected component is delivered forwardly, the pair of microswitches MS1 are activated by the component for delivering a component advancing signal to the indexing drum switch DS for thus initiating the component advancing function for the machine.

Drum switches are well known and are commercially available. Therefore, a detailed description of the employed drum switch DS is not deemed necessary to provide a complete understanding of the disclosed embodiment of the invention. However, as best illustrated in FIG. 30, the drum switch DS is of a cylindrical configuration, adapted to be driven by a pair of drum circuits 958 and operatively supported by suitable journaled axles 959. The drum is adapted to be selectively rotated through a selective use of suitable electrical stepping motors, not designated, located within the drum driver circuits 958. The motors serve to step the cylinder through a predetermined series of rotation steps in a manner dictated by an electrical input signal delivered thereto in any suitable manner.

About the periphery of the drum DS, there is provided a plurality of raised button-like protuberance 960. These protuberance engage resilient supports for electrical switch contacts 962 for thus effecting a closing of the contacts as the engagement is achieved. Hence, by positioning the protuberances 960 at selected locations about the periphery of the drum DS, selected contacts 962 are closed at a given step and by controlling the stepping of the drum through the drive of the circuits 958, a timing control is imposed on the circuit.

Therefore, a driving signal is delivered to a circuit 958 as the switch MS1 is closed for thus imposing on the drum switch DS a stepping rotation. As illustrated in the chart of FIG. 29, the drum switch, as it responds to a signal from the switch MS1, begins a stepping advanve through three steps in sequence. As the drum is advanced, one of the protuberances 960 engages a support of a selected one of the contacts 962 for thus closing the associated contacts for completing an electrical circuit to the component pusher selector valve 135 for initiating an operation of the component pusher 136. As the drum DS is advanced through its second step, the nail picker bar 364 is activated, as another set of the contacts 962 is closed, whereupon the pattern of the nails to be inserted through the plate 34 into the ends of the advanced vertical component is established. As the switch DS comes to rest at its fourth step, the pusher 136 will have advanced a component to a delivered position, whereat the advanced component serves to depress and thus close a circuit through the pair of microswitches MS2 in order that a signal may again be delivered to the drive circuit 958 of the drum switch DS for initiating a subsequent operation of a nail driving operation for the machine.

However, it should readily be apparent that a signal should be delivered from the machine control circuit 24 to the circuit 958 of the drum switch DS for effecting an operation of the pneumatic actuators 372 only when the plates 34 and the vertical components are rendered stationary. Hence, a circuit is closed through the switch LS2' to the drum switch DS for advancing the drum from its fourth step only when the switch Ls2' is actuated for assuring a total inactivation of the motor 220. With a circuit completed through a switch LS2' and the microswitch MS2, it is assured that the plates 34 are stationary and that the vertical components are properly positioned for nailing and are stationary, whereupon the switch DS is stepped to the sixth step. At the fifth step of the drum switch DS, through which the switch is stepped in response to the closing of the switches LS2' and MS2, a circuit to both of the nailer selector valves 373 is closed for initiating an actuation of the actuators 372 for advancing the heads 371 and effecting a nailing operation.

Each of the heads 371 is provided with a mount 464 which supports a pair of microswitch actuators 966 and 968, FIG. 6. As the heads 371 are advanced, each actuator 966 advances to close a microswitch MS3 located adjacent the position assumed by the microswitch actuator when the nails are fully seated. At this point, a signal is delivered through the pair of closed microswitches MS3 to the drive circuits 958 for again advancing the drum switch DS through an additional step. As the drum switch DS is rotated through the eighth step, in response to the closing of the switches MS3, the protuberances 960 serve to close a circuit to the selector valve 135 of the component pusher for effectively reversing the operative position of the component pusher as well as for reversing the direction of fluid flow through the selector valve 373, whereupon the operative positions of the actuators 372 are reversed for thus retracting the heads 371. At a selected point in the stepping of the drum switch, a circuit is completed through the switch DS back to the tape reader 22 and to the drive, not designated, for spools 26 to thus achieve an advancement of the tape 23 and the reader circuit, whereupon a new reading of the tape 23 is initiated and a new cycle of operation is introduced to the machine. This new reading is achieved subsequent to driving of the nails which is detected by switches MS4.

Subsequent to this point in the operation of the machine, the nail pattern previously established by a signal delivered from the circuit 23 is canceled through a retraction of the fingers 360 so that a new nail pattern may be established in response to a subsequent actuation of the control circuit.

Of course, at the appropriate instant in time determined by the coded intelligence of the tape 23, a circuit is completed through a switch LS2' whereby the machine control circuit 24 is afforded the opportunity to deliver a drive signal through the switch LS2' to the saw motor 414 and to the saw actuator 448 for effecting a selected severance of the trailing end portion of the plate 34. Since this signal is delivered through the switch LS2', the actuation of the saw can occur only when the wall is rendered stationary through an operation of the motor 220.

At this point, it is to be understood that a basic wall structure has been completed and that the wall is now prepared for finishing to a desired configuration or selected status of completion.

While it is entirely feasible to devise circuitry wherein each of the selected subsequent functions are controlled through an operation of the drum switch DS, it is preferred to drive the various control circuits 508, 624, 735, 835 and 920 directly from the machine control circuit 24 for initiating selected operations at the various slaved systems located at stations 12 through 20, which selectively serve to complete the assembly of the walls to a predetermined configuration. These control circuits are of a relatively simple design in that they each include a solenoid adapted to function, when energized, for performing a holding function for thus assuring a completion of a circuit through the associated limit switches LS3, LS6, LS10, LS12 and LS14. In the event no signal is delivered to a control circuit, the associated limit switch is rendered inoperative due to the fact that the circuit remains open through the control circuit and therefore no signal is transmitted upon the closing of the limit switch. Upon the closing of the various limit switches, in the presence of an activated control circuit, the operation at each of the succeeding stations is achieved in response to the closing of microswitches at selected stations.

Since the operation and functions of the circuit at the various stations have hereinbefore been set forth, a detailed description is not here deemed necessary.

OPERATION

It is believed that in view of the foregoing description, the operation of the device will be readily understood, however, it will be briefly reviewed at this point. With reference particularly to FIGS. 1, 2, and 28, it is assumed that plates 34 have been fed from the feeder assembly station 10 to the component assembly station 11 through the plate feed 30, with the leading ends thereof being aligned, manually, or through a suitable stop, not shown. Also, it is assumed that each of the hoppers 100 of the vertical component feed systems 32 selectively has been filled with a plurality of appropriate components 36, 38, 40, 44 and 46 to be incorporated in a completed wall and joined with the plates 34 as they are fed by the plate feed 30. It is also assumed that the nail tray 352 has been filled with appropriately sized nails and that the hoppers of the header inserting station 12, the window box inserting station 14, a brace inserting station 18 and the sheathing inserting station 20 have been filled with appropriate materials, and that the truss supporting the guide rails 706 which are employed in supporting the router 708 in translational displacement has been adjusted to an appropriate angle relative to the longitudinal axis of the path of the wall. It further is assumed that the brace delivering hopper 802 has been adjusted for depositing a brace in the recesses formed by the router and that the nailers 830 have been positioned for nailing the braces in position within the recesses, as ultimately required.

With the machine thus assembled and adjusted, it is assumed that there is supplied an intelligence bearing tape 23 encoded preferably by punching for optical reading in a manner appropriate for coding the various machine operations which are to be performed in response to operation of the control circuit 24. This tape is supplied to and fed through the tape reader 22 in predetermined increments. Feed of the tape is dictated by the operation of the drum switch DS. As the tape 23 is read by the tape reader, a series of machine control signals is delivered from the reader to the machine control circuit 24 which in turn delivers electrical output signals to initiate selected machine operations.

For each machine operation, the first output signal delivered from the circuit 24 is directed to a selected one of the selector valves 106 for causing an associated elevator 101 to effect delivery of a selected vertical component from one of the hoppers 100. As the selected vertical component is discharged from the hopper 100 it is seated upon a pair of conveyor chains 131 of the conveyor 130, which now delivers it to a first microswitch MS1. An output signal is initiated and delivered from the microswitch MS1 to the drive 458 of the drum switch DS for achieving an indexing thereof. An output is acquired from the operation of the drum switch and applied to a selector valve 135 of the component actuator 136. The actuator 136 is rendered active and advances the delivered component, now resting on the microswtich MS1, to a position between the wall plates 34 supported at the component assembly station 11. As the vertical component comes to rest, the nailer 262, having a previously selected pattern established in response to an output from the machine control circuit 24 is actuated in response to a signal delivered from the drum switch DS. As the earlier head 371 advances for effecting a driving of the nails, for thus joining the plates 34 and the guide plates 133 are retracted in order that the nailer 262 may insert the pattern of nails through the plate into the adjacent component.

Once a cycle of the nailer head 371 is completed, that is fully seated and then retracted, the motor 220 is activated for driving the pressure track assemblies 180 for advancing the wall plates 34, having the vertical component secured therebetween, for a duration and through a distance dictated by the operation of the stepping motor 294.

The stepping motor 294, in conjunction with the motor 220, serves to drive the pair of differentials 290 and 306 in a precise manner for achieving control over the advancement of the plates 34 and the associated vertical components disposed and secured therebetween. At the termination of the driving of the track assemblies 180, in response to a deactivation of the motor 220, a component selecting signal again is delivered from the machine control circuit 24 to the component feed station 10, whereupon another vertical component is delivered to a position between the plate 34, in a manner similar to previously that described, whereupon the component is secured to the plate 34 and the wall again is advanced through a driving of a motor 220, in response to a combined input to the differentials 290 and 306.

At the completion of the insertion of the appropriate number of components, as dictated by the tape 23, the actuators 448 for saws 404 and their associated motors 414 located at opposite sides of the machine are activated for causing the saws to swing into an operative disposition along a path extending transversely relative to both of the plates 34, for severing the ends of the wall plates at positions determined by the extent of their advancement, as determined in respnse to actuation of the pressure track assemblies 180. As the saws 404 advance toward the wall plates, the guide plates 133 are pivoted out of the path of the saws for accommodating a passage thereof. On completion of the severance of the plates 34, the wall is advanced to the header feeder station 12, and additional wall plates 34 are fed by the rollers 192 into an abutting relationship with the trailing portions of the wall prior to its advancement.

As the wall is delivered from the assembly station 11, the machine control circuit 24 delivers a command signal, in accordance with the input from the tape reader 22, to a control circuit 508 whereupon the limit switch LS3 is conditioned for activation.

As the wall is delivered to the station 12, the conveyor 500 serves to receive the wall and transport it through the station. In the event no circuit conditioning signal is delivered from the control circuit 24 to the control circuit 508, the conveyor will deliver the wall to the next-in-line station 14 for receiving a window box therein. However, in the event a signal from the circuit 24 is received at the control circuit 508, actuation of the limit switch LS3 causes the conveyor 500 to cease to advance the wall and an actuation of an elevator 501 is initiated.

The elevator 501 now delivers a header 504 in much the same manner as the elevators 101 deliver the vertical components from the hoppers 100. Due to the massiveness of the headers, the headers tend to seat under their own weight.

Once the headers are seated, the limit switches HS1 are actuated for activating the nailers 516 which are pivoted into an appropriate position by the actuator 510. The nailers 516 deliver nails through the adjacent studs into the ends of the headers 504 as they are seated at the distal end of the trimmers provided therefor by an insertion of a stud-trimmer 44 followed by a trimmer-stud 46. Once a nailing of the header is completed, the limit switch HS2 is activated for causing the conveyors 500 to advance the thus completed wall. While it is feasible to employ tracks utilizing dogs rather than the pressure conveyors 500 which are quite similar in design and operation to the tracks of the pressure track assemblies 180, the positioning of the wall relative to the hopper of the header feeder renders their use desirable.

Subsequent to the delivery of the wall from station 12, the wall is delivered to and received by a conveyor 600 which serves for advancing the wall through the window box inserting station 14. At this point in the machine's operation, a signal received at the control circuit 624, in response to an output signal from the machine control circuit 24, serves to render the limit switch LS6 effective for causing the advance of the wall to be arrested. As the advance of the wall is arrested, the prefabricated window boxes are fed and seated within the wall, whereupon a plurality of nailers 516 are rendered effective for nailing the window boxes in place.

In response to a completion of the nailing operation at the station 14, the wall again is advanced. As the wall is discharged from this station, it is delivered by the conveyor 600 to the adjacent conveyor 700 which delivers the wall through a router station 16 which includes the router 708. Here the router blade 709 provides a plurality of brace-receiving recesses in the various vertical components.

Subsequent to the formation of the recesses, in response to an output signal from the switch RS1, the wall is advanced to a brace inserting station including conveyors 800 whereupon a brace is delivered into the recesses formed by the router 708. This is achieved in response to a deactivation of the conveyor 800, through coaction of the control circuit 835, operating under the direct control of the machine control circuit 24 and a limit switch LS12.

As the conveyor 800 is deactivated, the hopper 802 serves to deposit a brace in the recesses formed at the router station 16. As the brace are delivered, a limit switch BS1 is activated for stepping the conveyor 800 through a distance sufficient for positioning the deposited brace beneath a plurality of ganged nailers 830 which are coupled together by pivotal linkage 832, through a common actuator 834. The actuator 834 pivotally displaces the nailers to an operative disposition, whereupon the nailers are rendered effective for nailing the braces in place and for subsequently reactivating the conveyor 800 for advancing the wall from the brace applicating station 16.

As is the case with stations 12 through 16, in the event no brace is to be applied at the station 18, the control circuit 835 serves to render the limit switch LS12 ineffective, whereby the conveyor 800 is permitted to continuously advance a wall through the brace applicating station without encountering any interruption.

Subsequent to the application of the brace, the wall is delivered by the conveyor 800 to a conveyor 900. This conveyor delivers the thus completed wall through the sheathing applicating station 20. The station 20 is quite similar in many respects to the stations 12 through 18, in that it is provided with a control circuit 920 for rendering a limit switch LS15 effective for deactivating the conveyor 900 and for activating the actuator 910 to effect a delivery of the individual sheets of gating sheathing. As the sheathing is seated, a limit switch SS1 is actuated, through an engagement of the sheathing for initiating operation of actuators 916 which serve to actuate the nailers 912 supported by a plurality of trunions 914 for bringing the nailers into operative disposition and effecting an operation thereof for joining the sheathing with the wall.

As the nailers 912 complete a nailing operation, they again are elevated, through the operation of the actuator 916, and the conveyor 900 again is activated, whereupon a completed wall is discharged from the station and from the machine. Of course, in the event no sheathing is to be delivered to the wall at the station 20, the control circuit 920 remains inactive so that the switch LS14 is rendered inoperative for permitting the conveyor 900 to deliver the wall through the station without interrupting its advances. The completed wall is now removed by any suitable mechanism.

In timing the operation of various machine components employed at the various stations, it should readily be apparent that differences in time deviation exist in achieving a completion of the various operations. However, fabrication of the wall at the stations 10 and 11 require the greatest quantity of time. Therefore, the remaining stations 12 through 20 may be spaced and operated in a manner such that an expiration of delivery time between the various stations serves to accommodate completion of the succeeding wall fabricating functions without creating an obstruction, through a completion and a delivery of preceding operations prior to the completion of the succeeding operations.

Furthermore, various time delay circuits, not shown, but of suitable design, may be incorporated, as required, in the various control circuits and, if desired, additional limit switches can be incorporated in the overall circuits in a manner consistent with assembly line control techniques. Since these techniques are deemed to be well within the skill of the art, a detailed description is omitted in the interest of brevity.

In view of the foregoing, it is readily apparent that the present invention provides a simplified process and machine for fabricating a plurality of unique walls to be employed in framing construction.

Although the invention has been herein shown and described in what is conceived to be the most practical and preferred process and apparatus, it is recognized that departures may be made therefrom within the scope of the invention.

Having described our invention, what we claim as new and desire to secure by Letters Patent is:

1. In a process for fabricating a wall of a type including a pair of wall plates arranged in substantial parallelism and a plurality of vertical support components extended between the plates, the steps comprising:
   A. intermittently advancing a pair of wall plates along a pair of substantially parallel paths through an assembly station;
   B. serially delivering a plurality of vertical support components along a common linear path into simultaneous engagement with said plates at said assembly station, said common linear path being extended from a source of vertical support components to said assembly station between said plates in substantial coplanar relation and in parallelism with said pair of parallel paths; and
   C. affixing each of said components to each of said plates at said assembly station while said plates are at rest.

2. The process of claim 1 further comprising the step of severing selected end portions of the wall plates, for thereby providing a wall of a predetermined length and including a predetermined plurality of vertical components extended between the plates and arranged in a predetermined sequence.

3. The process of claim 2 wherein the plurality of vertical components comprises a plurality of support members of a non-uniform configuration including studs, stud-trimmers, stud-blocks, block-studs and trimmer-studs of preselected dimensions.

4. The process of claim 3 wherein the plates simultaneously are advanced past a component inserting station and the members are inserted in a selected pattern, and wherein each insertion of a stud-trimmer is followed by an insertion of a trimmer-stud so that the exposed faces of the trimmers of the stud-trimmers and trimmer-studs define a door opening therebetween with the distal ends of the trimmers being in coplanar alignment for receiving thereon a door header.

5. The process of claim 4 wherein the ends of the wall plates are brought into initial alignment and subsequently are intermittently advanced in predetermined increments with the vertical components being delivered in a variable sequence to the common station and sequentially inserted between the plates during the successive dwell periods occurring between the advance of the plates so that as the plates are advanced from said station the components are fixedly secured therebetween for thus forming an intermittently advancing wall.

6. The process of claim 5 further comprising the steps of:
A. depositing and seating a header on the distal ends of the trimmers, subsequent to an incremental advance of the wall; and
B. securing the headers to the vertical components as they are seated.

7. The process of claim 6 further comprising the steps of:
A. delivering and seating a window box between selected adjacent studs during a dwell period; and
B. securing said window boxes in place, whereby a wall section comprising a pair of parallel plates having extended therebetween a plurality of selectively spaced components and including selectively oriented openings defined by trimmers, headers and window boxes.

8. The process of claim 2 further comprising the steps of forming a plurality of diagonally aligned recesses in selected vertical components to provide an opening adapted to receive a diagonally oriented let-in brace.

9. The process of claim 8 further comprising the steps of:
A. positioning a let-in brace in said aligned recesses; and
B. securing said brace in place.

10. The process according to claim 9 further comprising the steps of:
A. selectively positioning sheathing on said wall section; and
B. securing said sheathing to said wall section during said dwell period thereby to complete said wall.

* * * * *